United States Patent
Gao et al.

(10) Patent No.: US 12,335,965 B2
(45) Date of Patent: Jun. 17, 2025

(54) COMMUNICATION METHOD AND APPARATUS

(71) Applicant: HUAWEI TECHNOLOGIES CO., LTD., Shenzhen (CN)

(72) Inventors: Fei Gao, Shanghai (CN); Shurong Jiao, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 509 days.

(21) Appl. No.: 17/705,583

(22) Filed: Mar. 28, 2022

(65) Prior Publication Data
US 2022/0225393 A1  Jul. 14, 2022

Related U.S. Application Data

(63) Continuation of application No. PCT/CN2019/109772, filed on Sep. 30, 2019.

(51) Int. Cl.
*H04W 72/23* (2023.01)
*H04L 5/00* (2006.01)
(Continued)

(52) U.S. Cl.
CPC ............. *H04W 72/23* (2023.01); *H04L 5/001* (2013.01); *H04L 5/0053* (2013.01); *H04W 72/1273* (2013.01); *H04W 72/232* (2023.01)

(58) Field of Classification Search
CPC ..... H04W 72/02; H04W 72/04; H04W 72/10; H04W 72/0446; H04W 72/1273; H04W 72/1289; H04W 72/23; H04W 72/231; H04W 72/232; H04W 72/51; H04W 72/512; H04W 8/22; H04W 8/24; H04W 24/08; H04W 76/27; H04W 48/02; H04W 48/12; H04W 48/16; H04L 27/26025;
(Continued)

(56) References Cited

U.S. PATENT DOCUMENTS

| 2011/0205978 A1 | 8/2011 | Nory et al. |
| 2015/0223265 A1 | 8/2015 | Fwu et al. |

(Continued)

FOREIGN PATENT DOCUMENTS

| CN | 107852310 A | 3/2018 |
| CN | 110235484 A | 9/2019 |
| EP | 3139684 A1 | 3/2017 |

OTHER PUBLICATIONS

ETSI TS 136 213 V15.6.0; LTE (E-UTRA) Physical layer procedures: 3GPP TS 36.213 version 15.6.0 Release 15, (Jul. 2019), Sec. 9.0-9.3 PDCCH Procedures, pp. 347-379 (Year: 2019).*

(Continued)

*Primary Examiner* — Omer S Mian
*Assistant Examiner* — Scott A Schlack
(74) *Attorney, Agent, or Firm* — Maier & Maier, PLLC

(57) ABSTRACT

A communication method and apparatus may be applied to a wireless communication system, for example, 4G or 5G. The method includes: determining a monitoring span pattern in one slot and an actual monitoring capability in each monitoring span in the pattern based on configuration information such as an SS set and a bound CORESET of a terminal device; and monitoring DCI of each cell based on the actual monitoring capability.

8 Claims, 6 Drawing Sheets

(51) Int. Cl.
*H04W 72/1273* (2023.01)
*H04W 72/232* (2023.01)

(58) Field of Classification Search
CPC ............. H04L 27/26132; H04L 5/0007; H04L 5/0094; H04L 1/001; H04L 1/0027; H04L 1/0034; H04L 1/0035; H04L 1/0036; H04L 1/0038; H04L 25/02; H04L 25/0238
See application file for complete search history.

(56) References Cited

U.S. PATENT DOCUMENTS

| | | | |
|---|---|---|---|
| 2019/0098580 A1 | 3/2019 | Babaei et al. | |
| 2020/0163062 A1* | 5/2020 | Takeda | H04W 8/24 |
| 2020/0169991 A1* | 5/2020 | Lin | H04W 72/56 |
| 2020/0314678 A1* | 10/2020 | Lee | H04W 72/12 |
| 2020/0322918 A1* | 10/2020 | Shih | H04W 24/08 |
| 2020/0329389 A1* | 10/2020 | Hosseini | H04W 24/08 |
| 2020/0351644 A1* | 11/2020 | Yang | H04W 72/0446 |
| 2020/0351681 A1* | 11/2020 | Salah | H04W 72/23 |
| 2021/0014837 A1* | 1/2021 | Papasakellariou | H04W 72/23 |
| 2021/0029561 A1* | 1/2021 | Lin | H04W 72/23 |
| 2021/0168781 A1* | 6/2021 | Lee | H04W 72/23 |
| 2021/0329607 A1* | 10/2021 | Saber | H04W 72/23 |
| 2022/0053540 A1* | 2/2022 | Takeda | H04W 72/23 |
| 2022/0182860 A1* | 6/2022 | Chatterjee | H04L 5/0094 |
| 2022/0201515 A1* | 6/2022 | Chatterjee | H04L 1/0038 |
| 2022/0201691 A1* | 6/2022 | Shi | H04W 72/53 |
| 2022/0256529 A1* | 8/2022 | Xu | H04L 5/0053 |
| 2022/0329399 A1* | 10/2022 | Kittichokechai | H04W 8/24 |
| 2022/0338039 A1* | 10/2022 | Takahashi | H04L 27/26025 |

OTHER PUBLICATIONS

Qualcomm Incorporated, "Maintenance for physical downlink control channel", R1-1809426, 3GPP TSG RAN WG1 Meeting #94, Gothenburg, Sweden, Aug. 20-24, 2018, 16 pages.

"3rd Generation Partnership Project; Technical Specification Group Radio Access Network, NR, Physical channels and modulation(Release 15)", 3GPP TS 38.211 V15.6.0, Jun. 2019, 97 pages.

"RAN1 Chairman's Notes", 3GPP TSG RAN WG1 Meeting #96bis, Xi'an, China, Apr. 8-12, 2019, 108 pages.

"RAN1 Chairman's Notes", 3GPP TSG RAN WG1 Meeting #98, Prague, CZ, Aug. 26-30, 2019, 108 pages.

* cited by examiner

Terminal device    Network device

COMMUNICATION METHOD AND APPARATUS

CROSS-REFERENCE TO RELATED APPLICATIONS

This application is a continuation of International Application No. PCT/CN2019/109772, filed on Sep. 30, 2019, the disclosure of which is hereby incorporated by reference in its entirety.

TECHNICAL FIELD

The embodiments relate to the communication field, and in particular, to a communication method and apparatus.

BACKGROUND

In a cross-carrier scheduling scenario, a scheduling cell may schedule one or more scheduled cells. The scheduling cell may be a primary cell (PCell) operating on a primary component carrier (PCC), and the scheduled cell may be a secondary cell (SCell) operating on a secondary component carrier (SCC). Both downlink control information (DCI) of the scheduling cell and DCI of the scheduled cell are carried on the scheduling cell. Therefore, a network device needs to send, based on a capability supported by a terminal device, for example, monitoring a maximum number of blind detection (BD) times in a single cell and a maximum number of control channel elements (CCEs) in one slot, configuration information of a search space (SS) set to the terminal device by using radio resource control (RRC) signaling. Correspondingly, the terminal device needs to monitor a physical downlink control channel (PDCCH) of the scheduling cell based on the search space set, to obtain the DCI of the scheduling cell and the DCI of the scheduled cell, so as to demodulate data of the scheduling cell and data of the scheduled cell respectively.

SUMMARY

Embodiments provide a communication method and apparatus, to improve monitoring efficiency and scheduling efficiency.

To achieve the foregoing objectives, the following solutions are used.

According to a first aspect, a communication method is provided. The method may be performed by a terminal device or may be performed by a module such as a chip in a terminal device. The communication method includes: The terminal device receives first configuration information. The first configuration information includes first indication information and second indication information, the first indication information indicates a search space configuration of a scheduling cell, and the second indication information indicates a search space configuration of at least one scheduled cell corresponding to the scheduling cell. The terminal device determines a first monitoring span pattern based on the search space configuration of the scheduling cell and the search space configuration of the scheduled cell. The first monitoring span pattern includes N monitoring spans in a first time unit, and N is a positive integer. The terminal device monitors a first downlink control channel based on the first monitoring span pattern. The first downlink control channel carries downlink control information of the scheduling cell or downlink control information of the scheduled cell corresponding to the scheduling cell.

According to the communication method provided in the first aspect, the terminal device may determine a monitoring span pattern in one slot in a CA scenario based on first configuration information configured by a network device for the terminal device, determine an actual monitoring capability in each monitoring span in the monitoring span pattern based on a capability supported by the terminal device, and send and monitor a downlink control channel in the scheduling cell based on the actual monitoring capability, to obtain the downlink control information of the scheduling cell or the scheduled cell. This can resolve a problem of excessively long monitoring time caused by monitoring downlink control information of cells one by one at a slot granularity and improve monitoring efficiency. In addition, data channels of the scheduling cell and the scheduled cell can be scheduled by using a monitoring span as a scheduling granularity, to shorten a scheduling period and improve scheduling efficiency.

In a possible implementation of the first aspect, the terminal device determines a first monitoring capability based on the search space configuration of the scheduling cell, the search space configuration of the scheduled cell, and information about a capability supported by the terminal device or based on information about a capability supported by the terminal device. The first monitoring capability includes a monitoring capability of monitoring a downlink control channel by the terminal device in each of the N monitoring spans. The terminal device monitors the first downlink control channel based on the first monitoring capability.

In a possible implementation of the first aspect, the terminal device sends a first capability report. The first capability report is used for indicating the information about the capability supported by the terminal device, and the first capability report includes a mapping relationship between a reference number of cells for downlink control channel blind detection and the monitoring capability of the terminal device in each of the N monitoring spans. Optionally, the first monitoring capability is a monitoring capability indicated by the first capability report.

In a possible implementation of the first aspect, the terminal device sends a second capability report. The second capability report is used for indicating information about a PDCCH monitoring capability supported by the terminal device, and the second capability report includes the monitoring capability of monitoring the downlink control channel by the terminal device in each of the N monitoring spans.

In a possible implementation of the first aspect, the first monitoring capability is $r*C1$. $C1$ is a monitoring capability of monitoring a downlink control channel of one cell by the terminal device in each of the N monitoring spans, and $r$ is a positive real number greater than 1.

In a possible implementation of the first aspect, the first monitoring capability is $\max\{C(i)\}$. $C(i)$ is a monitoring capability in an $i^{th}$ monitoring span in the N monitoring spans. $C(i)=r1*C1+M(i)*r2*C1$. $C1$ is a monitoring capability of monitoring a downlink control channel of one cell by the terminal device in each of the N monitoring spans, $M(i)$ is a number of scheduled cells that are configured in the $i^{th}$ monitoring span and that correspond to the scheduling cell, $r1$ and $r2$ are real numbers less than or equal to 1 and greater than 0, and $i$ is a positive integer less than or equal to N.

In a possible implementation of the first aspect, the first monitoring capability is $\max\{C(i)\}$. $C(i)$ is a monitoring capability in an $i^{th}$ monitoring span in the N monitoring spans, and $i$ is a positive integer less than or equal to N.

When no search space of the scheduling cell is configured in the $i^{th}$ monitoring span, $C(i)=M(i)*r2*C1$. When only a search space of the scheduling cell is configured in the $i^{th}$ monitoring span, $C(i)=r1*C1$. When both a search space of the scheduling cell and a search space of the scheduled cell are configured in the $i^{th}$ monitoring span, $C(i)=C1+M(i)*r2*C1$. $M(i)$ is a number of scheduled cells that are configured in the $i^{th}$ monitoring span and that correspond to the scheduling cell, C1 is a monitoring capability of monitoring a downlink control channel of one cell by the terminal device in each of the N monitoring spans, and r2 is a real number less than or equal to 1 and greater than 0.

In a possible implementation of the first aspect, the first monitoring capability includes a monitoring capability $C(i)$ in an $i^{th}$ monitoring span in the N monitoring spans. i is a positive integer less than or equal to N. $C(i)=r1*C1+M(i)*r2*C1$. $M(i)$ is a number of scheduled cells that are configured in the $i^{th}$ monitoring span and that correspond to the scheduling cell, C1 is a monitoring capability of monitoring a downlink control channel of one cell by the terminal device in each of the N monitoring spans, and r1 and r2 are real numbers less than or equal to 1 and greater than 0.

In a possible implementation of the first aspect, the first monitoring capability includes a monitoring capability $C(i)$ in an $i^{th}$ monitoring span in the N monitoring spans. i is a positive integer less than or equal to N. When no search space of the scheduling cell is configured in the $i^{th}$ monitoring span, $C(i)=M(i)*r2*C1$. When only a search space of the scheduling cell is configured in the $i^{th}$ monitoring span, $C(i)=r1*C1$. When both a search space of the scheduling cell and a search space of the scheduled cell are configured in the $i^{th}$ monitoring span, $C(i)=C1+M(i)*r2*C1$. $M(i)$ is a number of scheduled cells that are configured in the $i^{th}$ monitoring span and that correspond to the scheduling cell, C1 is a monitoring capability of monitoring a downlink control channel of one cell by the terminal device in each of the N monitoring spans, and r2 is a real number less than or equal to 1 and greater than 0.

In a possible implementation of the first aspect, the terminal device determines a second monitoring span pattern of the scheduling cell based on the search space set of the scheduling cell and a corresponding CORESET configuration. The second monitoring span pattern includes N1 monitoring spans in the first time unit, and N1 is a positive integer. The terminal device determines a third monitoring span pattern of a first scheduled cell based on a search space configuration of the first scheduled cell. The third monitoring span pattern includes N2 monitoring spans in the first time unit, N2 is a positive integer, and the first scheduled cell is one scheduled cell in the scheduled cell. The terminal device determines the N monitoring spans based on the N1 monitoring spans and the N2 monitoring spans.

In a possible implementation of the first aspect, when a $j^{th}$ monitoring span in the N1 monitoring spans and a $k^{th}$ monitoring span in the N2 monitoring spans partially overlap, completely overlap, or are connected head-to-tail, the terminal device determines that a $t^{th}$ monitoring span in the N monitoring spans meets the following condition: An index of a start symbol of the $t^{th}$ monitoring span is less than or equal to an index of a start symbol of the $j^{th}$ monitoring span, and is less than or equal to an index of a start symbol of the $k^{th}$ monitoring span; and an index of an end symbol of the $t^{th}$ monitoring span is greater than or equal to an index of an end symbol of the $j^{th}$ monitoring span, and is greater than or equal to an index of an end symbol of the $k^{th}$ monitoring span. A number of consecutive time-domain symbols included in the $t^{th}$ monitoring span needs to be equal to a value of Y of at least one monitoring span pattern in a PDCCH monitoring capability report reported by the terminal device. j is a positive integer less than or equal to N1, k is a positive integer less than or equal to N2, and t is a positive integer less than or equal to N.

In a possible implementation of the first aspect, the first configuration information is carried in a radio resource control RRC connection reconfiguration message. Correspondingly, when a time length of the $t^{th}$ monitoring span is greater than a maximum value of a monitoring span defined in a protocol, the terminal device sends an RRC connection reconfiguration failure message to the network device.

According to a second aspect, a communication method is provided. The method may be performed by a network device or may be performed by a module such as a chip in a network device. The communication method includes: The network device sends first configuration information to a terminal device. The first configuration information includes first indication information and second indication information, the first indication information indicates a search space configuration of a scheduling cell, and the second indication information indicates a search space configuration of at least one scheduled cell corresponding to the scheduling cell. The network device determines a first monitoring span pattern based on the search space configuration of the scheduling cell and the search space configuration of the scheduled cell. The first monitoring span pattern includes N monitoring spans in a first time unit, and N is a positive integer. The network device sends a first downlink control channel based on the first monitoring span pattern. The first downlink control channel carries downlink control information of the scheduling cell or downlink control information of the scheduled cell corresponding to the scheduling cell.

In a possible implementation of the second aspect, the network device determines a first monitoring capability based on the search space configuration of the scheduling cell, the search space configuration of the scheduled cell, and information about a capability supported by the terminal device or based on information about a capability supported by the terminal device. The first monitoring capability includes a monitoring capability of monitoring a downlink control channel by the terminal device in each of the N monitoring spans. The network device sends the first downlink control channel based on the first monitoring capability.

In a possible implementation of the second aspect, the network device receives a first capability report. The first capability report is used for indicating the information about the capability supported by the terminal device, and the first capability report includes a mapping relationship between a reference number of cells for downlink control channel blind detection and the monitoring capability of the terminal device in each of the N monitoring spans. The network device determines the first monitoring capability based on the mapping relationship.

In a possible implementation of the second aspect, the first monitoring capability is $r*C1$. C1 is a monitoring capability of monitoring a downlink control channel of one cell by the terminal device in each of the N monitoring spans, and r is a positive real number greater than 1.

In a possible implementation of the second aspect, the first monitoring capability is $\max\{C(i)\}$. $C(i)$ is a monitoring capability in an $i^{th}$ monitoring span in the N monitoring spans. $C(i)=r1*C1+M(i)*r2*C1$. C1 is a monitoring capability of monitoring a downlink control channel of one cell by the terminal device in each of the N monitoring spans, $M(i)$ is a number of scheduled cells that are configured in the $i^{th}$ monitoring span and that correspond to the scheduling cell, r1 and r2 are real numbers less than or equal to 1 and greater than 0, and i is a positive integer less than or equal to N.

In a possible implementation of the second aspect, the first monitoring capability is max{C(i)}. C(i) is a monitoring capability in an $i^{th}$ monitoring span in the N monitoring spans, and i is a positive integer less than or equal to N. When no search space of the scheduling cell is configured in the $i^{th}$ monitoring span, C(i)=M(i)*r2*C1. When only a search space of the scheduling cell is configured in the $i^{th}$ monitoring span, C(i)=r1*C1. When both a search space of the scheduling cell and a search space of the scheduled cell are configured in the $i^{th}$ monitoring span, C(i)=C1+M(i)*r2*C1. M(i) is a number of scheduled cells that are configured in the $i^{th}$ monitoring span and that correspond to the scheduling cell, C1 is a monitoring capability of monitoring a downlink control channel of one cell by the terminal device in each of the N monitoring spans, and r2 is a real number less than or equal to 1 and greater than 0.

In a possible implementation of the second aspect, the first monitoring capability may include a monitoring capability C(i) in an $i^{th}$ monitoring span in the N monitoring spans. i is a positive integer less than or equal to N. C(i)=r1*C1+M(i)*r2*C1. M(i) is a number of scheduled cells that are configured in the $i^{th}$ monitoring span and that correspond to the scheduling cell, C1 is a monitoring capability of monitoring a downlink control channel of one cell by the terminal device in each of the N monitoring spans, and r1 and r2 are real numbers less than or equal to 1 and greater than 0.

In a possible implementation of the second aspect, the first monitoring capability includes a monitoring capability C(i) in an $i^{th}$ monitoring span in the N monitoring spans. i is a positive integer less than or equal to N. When no search space of the scheduling cell is configured in the $i^{th}$ monitoring span, C(i)=M(i)*r2*C1. When only a search space of the scheduling cell is configured in the $i^{th}$ monitoring span, C(i)=r1*C1. When both a search space of the scheduling cell and a search space of the scheduled cell are configured in the $i^{th}$ monitoring span, C(i)=C1+M(i)*r2*C1. M(i) is a number of scheduled cells that are configured in the $i^{th}$ monitoring span and that correspond to the scheduling cell, C1 is a monitoring capability of monitoring a downlink control channel of one cell by the terminal device in each of the N monitoring spans, and r2 is a real number less than or equal to 1 and greater than 0.

In a possible implementation of the second aspect, the network device determines a second monitoring span pattern of the scheduling cell based on the search space configuration of the scheduling cell. The second monitoring span pattern includes N1 monitoring spans in the first time unit, and N1 is a positive integer. The network device determines a third monitoring span pattern of a first scheduled cell based on a search space configuration of the first scheduled cell. The third monitoring span pattern includes N2 monitoring spans in the first time unit, N2 is a positive integer, and the first scheduled cell is one scheduled cell in the scheduled cell. The network device determines the N monitoring spans based on the N1 monitoring spans and the N2 monitoring spans.

In a possible implementation of the second aspect, when a $j^{th}$ monitoring span in the N1 monitoring spans and a $k^{th}$ monitoring span in the N2 monitoring spans partially overlap, completely overlap, or are connected head-to-tail, the network device determines that a $t^{th}$ monitoring span in the N monitoring spans meets the following condition: An index of a start symbol of the $t^{th}$ monitoring span is less than or equal to an index of a start symbol of the $j^{th}$ monitoring span, and is less than or equal to an index of a start symbol of the $k^{th}$ monitoring span; and an index of an end symbol of the $t^{th}$ monitoring span is greater than or equal to an index of an end symbol of the $j^{th}$ monitoring span, and is greater than or equal to an index of an end symbol of the $k^{th}$ monitoring span. j is a positive integer less than or equal to N1, k is a positive integer less than or equal to N2, and t is a positive integer less than or equal to N.

In a possible implementation of the second aspect, the first configuration information is carried in a radio resource control RRC connection reconfiguration message. When a time length of the $i^{th}$ monitoring span is greater than a maximum value of a monitoring span defined in a protocol, the network device receives an RRC connection reconfiguration failure message from the terminal device.

For effects of the communication method according to the second aspect, refer to effects of the communication method according to the first aspect. Details are not described herein again.

According to a third aspect, a communication apparatus is provided, and is configured to implement the method in any one of the first aspect or the possible implementations of the first aspect. The communication apparatus includes a processing unit and a transceiver unit. The transceiver unit is configured to receive first configuration information. The first configuration information includes first indication information and second indication information, the first indication information indicates a search space configuration of a scheduling cell, and the second indication information indicates a search space configuration of at least one scheduled cell corresponding to the scheduling cell. The processing unit is configured to determine a first monitoring span pattern based on the search space configuration of the scheduling cell and the search space configuration of the scheduled cell. The first monitoring span pattern includes N monitoring spans in a first time unit, and N is a positive integer. The processing unit is further configured to control, based on the first monitoring span pattern, the transceiver unit to monitor a first downlink control channel. The first downlink control channel carries downlink control information of the scheduling cell or downlink control information of the scheduled cell corresponding to the scheduling cell.

In a possible implementation of the third aspect, the processing unit is configured to determine a first monitoring capability based on the search space configuration of the scheduling cell, the search space configuration of the scheduled cell, and information about a capability supported by a terminal device or based on information about a capability supported by the terminal device. The first monitoring capability includes a monitoring capability of monitoring a downlink control channel by the terminal device in each of the N monitoring spans. The processing unit is further configured to control, based on the first monitoring capability, the transceiver unit to monitor the first downlink control channel.

In a possible implementation of the third aspect, the transceiver unit is further configured to send a first capability report. The first capability report is used for indicating the information about the capability supported by the terminal device, and the first capability report includes a mapping relationship between a reference number of cells for downlink control channel blind detection and a monitoring capability of the terminal device in each of the N monitoring spans. Optionally, the processing unit is further configured to determine the first monitoring capability based on the first capability report. The first monitoring capability may be a monitoring capability indicated by the first capability report.

In a possible implementation of the third aspect, the transceiver unit is further configured to send a second capability report. The second capability report is used for indicating information about a capability supported by the terminal device, and the second capability report includes the monitoring capability of monitoring the downlink control channel by the terminal device in each of the N monitoring spans. Correspondingly, the processing unit is further configured to determine the first monitoring capability based on the second capability report.

In a possible implementation of the third aspect, the processing unit is further configured to determine a second monitoring span pattern of the scheduling cell based on the search space configuration of the scheduling cell. The second monitoring span pattern includes N1 monitoring spans in the first time unit, and N1 is a positive integer. The processing unit is further configured to determine a third monitoring span pattern of a first scheduled cell based on a search space configuration of the first scheduled cell. The third monitoring span pattern includes N2 monitoring spans in the first time unit, N2 is a positive integer, and the first scheduled cell is one scheduled cell in the scheduled cell. The processing unit is further configured to determine the N monitoring spans based on the N1 monitoring spans and the N2 monitoring spans.

In a possible implementation of the third aspect, the processing unit is further configured to: when a $j^{th}$ monitoring span in the N1 monitoring spans and a kV monitoring span in the N2 monitoring spans partially overlap, completely overlap, or are connected head-to-tail, determine that a $t^{th}$ monitoring span in the N monitoring spans meets the following condition: an index of a start symbol of the $t^{th}$ monitoring span is less than or equal to an index of a start symbol of the $j^{th}$ monitoring span, and is less than or equal to an index of a start symbol of the $k^h$ monitoring span; and an index of an end symbol of the $t^{th}$ monitoring span is greater than or equal to an index of an end symbol of the $j^{th}$ monitoring span, and is greater than or equal to an index of an end symbol of the $k^{th}$ monitoring span. j is a positive integer less than or equal to N1, k is a positive integer less than or equal to N2, and t is a positive integer less than or equal to N.

In a possible implementation of the third aspect, the first configuration information is carried in a radio resource control RRC connection reconfiguration message. Correspondingly, the transceiver unit is further configured to: when a time length of the $t^{th}$ monitoring span is greater than a maximum value of a monitoring span defined in a protocol, send an RRC connection reconfiguration failure message to a network device.

Optionally, the communication apparatus according to the third aspect may further include a storage unit, and the storage unit stores a program or instructions. When the processing unit executes the program or the instructions, the communication apparatus according to the third aspect is enabled to perform functions of the terminal device in the communication method according to the first aspect.

It should be noted that the communication apparatus in the third aspect may be a terminal device or may be a chip or a chip system disposed in a terminal device. This is not limited.

According to a fourth aspect, a communication apparatus is provided, and is configured to implement the method in any one of the second aspect or the possible implementations of the second aspect. The communication apparatus includes a processing unit and a transceiver unit. The transceiver unit is configured to send first configuration information to a terminal device. The first configuration information includes first indication information and second indication information, the first indication information indicates a search space configuration of a scheduling cell, and the second indication information indicates a search space configuration of at least one scheduled cell corresponding to the scheduling cell. The processing unit is configured to determine a first monitoring span pattern based on the search space configuration of the scheduling cell and the search space configuration of the scheduled cell. The first monitoring span pattern includes N monitoring spans in a first time unit, and N is a positive integer. The processing unit is further configured to control, based on the first monitoring span pattern, the transceiver unit to send a first downlink control channel. The first downlink control channel carries downlink control information of the scheduling cell or downlink control information of the scheduled cell corresponding to the scheduling cell.

In a possible implementation of the fourth aspect, the processing unit is further configured to: determine a first monitoring capability based on the search space configuration of the scheduling cell, the search space configuration of the scheduled cell, and information about a capability supported by the terminal device, or based on information about a capability supported by the terminal device; and control, based on the first monitoring capability, the transceiver unit to send the first downlink control channel. The first monitoring capability includes a monitoring capability of monitoring a downlink control channel by the terminal device in each of the N monitoring spans.

In a possible implementation of the fourth aspect, the transceiver unit is further configured to receive a first capability report. The first capability report is used for indicating the information about the capability supported by the terminal device, and the first capability report includes a mapping relationship between a reference number of cells for downlink control channel blind detection and a monitoring capability of the terminal device in each of the N monitoring spans. The processing unit is further configured to determine the first monitoring capability based on the mapping relationship.

In a possible implementation of the fourth aspect, the processing unit is further configured to determine a second monitoring span pattern of the scheduling cell based on the search space configuration of the scheduling cell. The second monitoring span pattern includes N1 monitoring spans in the first time unit, and N1 is a positive integer. The processing unit is further configured to determine a third monitoring span pattern of a first scheduled cell based on a search space configuration of the first scheduled cell. The third monitoring span pattern includes N2 monitoring spans in the first time unit, N2 is a positive integer, and the first scheduled cell is one scheduled cell in the scheduled cell. The processing unit is further configured to determine the N monitoring spans based on the N1 monitoring spans and the N2 monitoring spans.

In a possible implementation of the fourth aspect, the processing unit is further configured to: when a $j^{th}$ monitoring span in the N1 monitoring spans and a $k^{th}$ monitoring span in the N2 monitoring spans partially overlap, completely overlap, or are connected head-to-tail, determine that a $t^{th}$ monitoring span in the N monitoring spans meets the following condition: an index of a start symbol of the $t^{th}$ monitoring span is less than or equal to an index of a start symbol of the $j^{th}$ monitoring span, and is less than or equal to an index of a start symbol of the $k^{th}$ monitoring span; and an index of an end symbol of the $t^{th}$ monitoring span is greater than or equal to an index of an end symbol of the $j^{th}$ monitoring span, and is greater than or equal to an index of an end symbol of the $k^{th}$ monitoring span. j is a positive integer less than or equal to N1, k is a positive integer less than or equal to N2, and t is a positive integer less than or equal to N.

In a possible implementation of the fourth aspect, the first configuration information is carried in a radio resource control RRC connection reconfiguration message. The transceiver unit is further configured to: when a time length of the $t^{th}$ monitoring span is greater than a maximum value of a monitoring span defined in a protocol, receive an RRC connection reconfiguration failure message from the terminal device.

Optionally, the communication apparatus according to the fourth aspect may further include a storage module, and the storage module stores a program or instructions. When the processing unit executes the program or the instructions, the communication apparatus according to the fourth aspect is enabled to perform functions of the network device in the communication method according to the second aspect.

It should be noted that the communication apparatus in the fourth aspect may be a network device or may be a chip or a chip system disposed in a network device. This is not limited.

According to a fifth aspect, a communication apparatus is provided. The communication apparatus includes a function module configured to perform the method in any one of the first aspect or the possible implementations of the first aspect or includes a function module configured to perform the method in any one of the second aspect or the possible implementations of the second aspect. The module may be the processing unit or the transceiver unit in the third aspect and the fourth aspect, or a combination of the processing unit and the transceiver unit.

According to a sixth aspect, a communication apparatus is provided. The communication apparatus includes a processor and an interface circuit. The interface circuit is configured to receive a signal from another communication apparatus outside the communication apparatus and transmit the signal to the processor or send a signal from the processor to another communication apparatus outside the communication apparatus. The processor is configured to implement the method in any one of the first aspect or the possible implementations of the first aspect or implement the method in any one of the second aspect or the possible implementations of the second aspect by using a logic circuit or executing code instructions.

In an embodiment, the interface circuit according to the sixth aspect may be a transceiver. The transceiver may be a transceiver circuit or an input/output interface. The transceiver may be used by the communication apparatus to communicate with the another communication apparatus.

The communication apparatus in the sixth aspect may be a terminal device or a network device, or a chip or a chip system disposed in a terminal device or a network device.

According to a seventh aspect, a communication system is provided. The communication system includes the terminal device according to any one of the third aspect, the fifth aspect, or the possible implementations of the third aspect and the network device according to any one of the fourth aspect, the sixth aspect, or the possible implementations of the fourth aspect.

According to an eighth aspect, a computer-readable storage medium is provided. The storage medium stores a computer program or instructions. When the computer program or the instructions is or are executed by a communication apparatus, the method in any one of the first aspect or the possible implementations of the first aspect is implemented, or the method in any one of the second aspect or the possible implementations of the second aspect is implemented.

According to a ninth aspect, a computer program is provided. When the computer program is executed by a communication apparatus, the method in any one of the first aspect or the possible implementations of the first aspect, or the method in any one of the second aspect or the possible implementations of the second aspect is implemented.

According to a tenth aspect, a computer program product is provided. The computer program product includes a computer program or instructions. When the computer program or the instructions is or are run on a computer, the method in any one of the first aspect or the possible implementations of the first aspect is implemented, or the method in any one of the second aspect or the possible implementations of the second aspect is implemented.

DETAILED DESCRIPTION OF THE EMBODIMENTS

The following describes the solutions with reference to the accompanying drawings.

The solutions in embodiments may be applied to various communication systems, for example, a 4th generation (4G) mobile communication system, such as a long term evolution (LTE) system, a worldwide interoperability for microwave access (WiMAX) communication system, a new radio (NR) system of a 5th generation (5G) mobile communication system, and a future communication system, for example, a 6th generation (6G) mobile communication system.

All aspects, embodiments, or features are presented by describing a system that may include a plurality of devices, components, modules, and the like. It should be understood that systems may include another device, component, or module. In addition, a combination of these solutions may be used.

In addition, in embodiments, the terms such as "example" and "for example" are used for representing giving an example, an illustration, or a description. Any embodiment described as an "example" should not be explained as being more preferred or having more advantages than another embodiment or. The term "example" is used for presenting a concept.

In embodiments, "of", "related", and "corresponding" may be interchangeably used sometimes. It should be noted that meanings expressed by the terms are consistent when differences are not emphasized.

In embodiments, sometimes a subscript such as $W_1$ may be written in an incorrect form such as $W_1$. Expressed meanings are consistent when differences between them are not emphasized.

A network architecture and a service scenario described in embodiments are intended to describe the solutions in embodiments more clearly, and do not constitute any limitation on the solutions provided in embodiments. A person of ordinary skill in the art may know that with evolution of the network architecture and emergence of a new service scenario, the solutions provided in embodiments are also applicable to similar problems.

Figure 1:
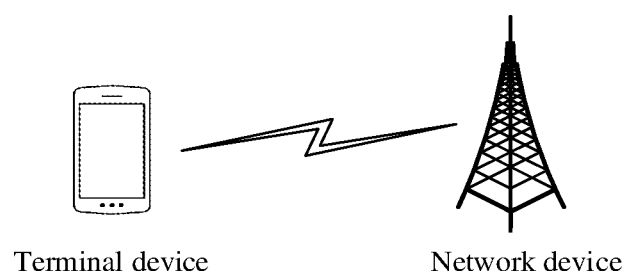
FIG. 1 is a schematic diagram of an architecture of a communication system according to an embodiment.

Some scenarios in embodiments are described by using a scenario in a communication system shown in FIG. 1 as an example. It should be noted that the solutions in embodiments may also be used in another mobile communication system, and a corresponding name may also be replaced with a name of a corresponding function in the another mobile communication system.

For ease of understanding embodiments, a communication system shown in FIG. 1 is used as an example to describe in detail a communication system to which embodiments are applicable. FIG. 1 is a schematic diagram of an architecture of a communication system to which a communication method according to an embodiment is applicable. As shown in FIG. 1, the communication system includes a network device and a terminal device.

The terminal device may be configured to perform the following step: receiving first configuration information. The first configuration information includes first indication information and second indication information, the first indication information indicates a search space configuration of a scheduling cell, and the second indication information indicates a search space configuration of at least one scheduled cell corresponding to the scheduling cell. Then, the terminal device determines a first monitoring span pattern based on the search space configuration of the scheduling cell and the search space configuration of the scheduled cell. The first monitoring span pattern includes N monitoring spans in a first time unit, and N is a positive integer. Then, the terminal device monitors a first downlink control channel based on the first monitoring span pattern. The first downlink control channel carries downlink control information of the scheduling cell or downlink control information of the scheduled cell corresponding to the scheduling cell.

Correspondingly, the network device is configured to perform the following step: sending the first configuration information to the terminal device. The first configuration information includes the first indication information and the second indication information, the first indication information indicates the search space configuration of the scheduling cell, and the second indication information indicates the search space configuration of the scheduled cell corresponding to the scheduling cell. Then, the network device determines the first monitoring span pattern based on the search space configuration of the scheduling cell and the search space configuration of the scheduled cell. The first monitoring span pattern includes the N monitoring spans in the first time unit, and N is a positive integer. Then, the network device sends the first downlink control channel based on the first monitoring span pattern. The first downlink control channel carries the downlink control information of the scheduling cell or the downlink control information of the scheduled cell corresponding to the scheduling cell.

The network device is located on a network side of the communication system. The terminal device is connected to a radio access network device in a wireless manner, to access a mobile communication system. The network device may be a base station, an evolved NodeB (eNodeB), a transmission reception point (TRP), a next generation NodeB (gNB) in a 5G mobile communication system, a base station in a future mobile communication system, an access node in a Wi-Fi system, or the like; or the network device may be a module or a unit that implements a part of functions of a base station, for example, may be a central unit (CU), or a distributed unit (DU). A technology and a device form that are used by the network device are not limited in embodiments.

The terminal device may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A technology and a device form that are used by the terminal device are not limited in embodiments. It should be noted that the communication method provided in this embodiment may be applied between any two nodes shown in FIG. 1, for example, between terminal devices, between network devices, or between a terminal device and a network device. For communication between terminal devices, if there is a network device, it is a scenario with network coverage. If there is no network device, it is a scenario without network coverage. In the scenario with network coverage, communication between terminal devices may be performed by using a resource configured by the network device. In the scenario without network coverage, communication between terminal devices may be performed by using a preconfigured resource.

It should be understood that FIG. 1 is a simplified schematic diagram of an example for ease of understanding. The communication system may further include another network device and/or another terminal device that are/is not shown in FIG. 1.

The following uses the 5G mobile communication system as an example to describe related terms in the solutions.

1. Monitoring Span

An ultra reliable and low latency communication (URLLC) service is defined in the 5G communication system. To meet a latency requirement of the URLLC service, a monitoring span is introduced into the 5G communication system, and the monitoring span may also be referred to as a span for short. For ease of description, the monitoring span is referred to as a span in embodiments.

A length of each monitoring span is at least Y consecutive symbols, and Y is an integer greater than 0. The Y consecutive symbols are consecutive in time domain (there is no interval with more than one symbol). Currently, the monitoring span is restricted by the following rules:

1. An overlapping symbol cannot exist between monitoring spans as one symbol cannot belong to two monitoring spans at the same time.
2. Each monitoring span is included in one separate slot as the monitoring span cannot cross a boundary of the slot.
3. Each PDCCH monitoring occasion (MO) is completely included in one monitoring span as one MO cannot cross a boundary of the monitoring span. The MO herein indicates duration in which one terminal device blindly detects a PDCCH and is determined based on both one monitoring start position and a control resource set (CORESET) that is bound to a monitored search space set. For example, a monitoring start position at which the terminal device monitors one search space set is a first symbol in one slot, and the search space set is bound to one CORESET with a length of three symbols. Therefore, an MO for monitoring the search space set is the first three symbols, namely, a first symbol, a second symbol, and a third symbol, in a slot in which the MO is located.
4. For all PDCCH MOs in one slot, a number of different start symbols of a monitoring span cannot exceed floor (14/X), where X is a minimum value of a symbol interval between two adjacent monitoring spans that is supported by the terminal device. floor( ) indicates an operation of rounding down to a nearest integer.

For example, division of a monitoring span in one slot may be preset in a protocol, configured by the base station by using a higher-layer parameter, or determined by the terminal device according to a preset rule in a protocol and based on a higher-layer parameter. One monitoring span includes several symbols, and lengths of all monitoring spans in one slot may be the same or different. For example, lengths of some monitoring spans in one slot include seven symbols, and lengths of some monitoring spans include one or two symbols.

In view of this, embodiments study how to determine a monitoring capability corresponding to a monitoring span in a carrier aggregation (CA) scenario after the monitoring span is introduced, so that the terminal device monitors a PDCCH in the monitoring span.

For example, the first time unit described in embodiments may be one or more slots. The first time unit may be a time granularity smaller than a length of a slot, for example, may be a time unit including several consecutive symbols, half slots, or sub-slots.

2. PCC, SCC, PCell, and SCell

A serving cell group (SCG, which may also be referred to as a serving cell set, serving cell set) configured by the network device for the terminal device includes a PCell and an SCell. The PCell is a cell operating on a primary component carrier. The terminal device may select a primary cell in an initial connection establishment process or a connection re-establishment process of the primary cell or may select a target cell as a primary cell in a handover process. A carrier corresponding to the PCell is referred to as a PCC. A downlink (DL) carrier of the PCell is referred to as a DL PCC, and an uplink (UL) carrier of the PCell is referred to as a UL PCC. The SCell is a cell operating on a secondary component carrier. Once an RRC connection is established, a secondary cell may be configured to provide additional radio resources. If CA is not configured for a terminal device in an RRC connected mode, the terminal device has only one serving cell, namely, the PCell. If CA is configured, the serving cell group includes the PCell and the SCell. A carrier corresponding to the SCell is referred to as a secondary component carrier SCC. A downlink carrier of the SCell is referred to as a DL SCC, and an uplink carrier of the SCell is referred to as a UL SCC.

Figure 2:
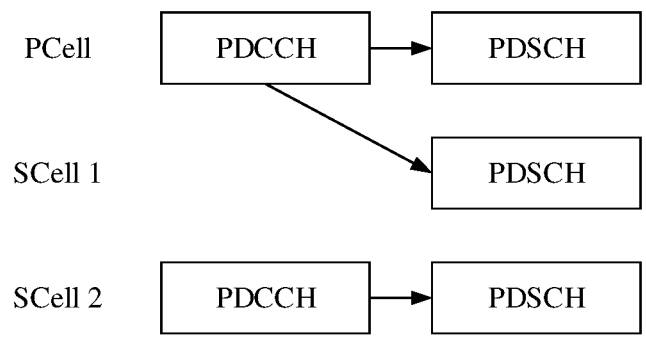
FIG. 2 is a schematic diagram 1 of an SCG in a CA scenario according to an embodiment.

It should be noted that the PCell is usually a self-scheduling cell, and the SCell may be a self-scheduling cell, or may be a scheduled cell scheduled by the PCell. The PCell may also be referred to as a scheduling cell relative to the scheduled SCell. For example, FIG. 2 is a schematic diagram 1 of an SCG in a CA scenario according to an embodiment. As shown in FIG. 2, a PCell is a scheduling cell, and both an SCell 1 and an SCell 2 are secondary cells. The SCell 1 is a scheduled cell. A physical downlink shared channel (PDSCH) in the SCell 1 is scheduled by a PDCCH in the PCell, but the SCell 2 is a self-scheduling cell. A PDSCH in the SCell 2 is scheduled by a PDCCH in the SCell 2. It is easy to understand that, if an SCell is scheduled by another cell, no downlink control channel needs to be configured for the SCell, because downlink control information corresponding to the SCell is carried on a downlink control channel of a scheduling cell that schedules the SCell. In addition, there is no RRC connection between the scheduled SCell and a terminal device. Therefore, after an initial security activation procedure is performed, one or more scheduled cells may be added/modified/released by using an RRC connection reconfiguration message between the scheduling cell and the terminal device.

In addition, in the CA scenario, a plurality of serving cells are configured, and one cell corresponds to one component carrier (CC). Different CCs may be used for providing different coverage.

Figure 3:
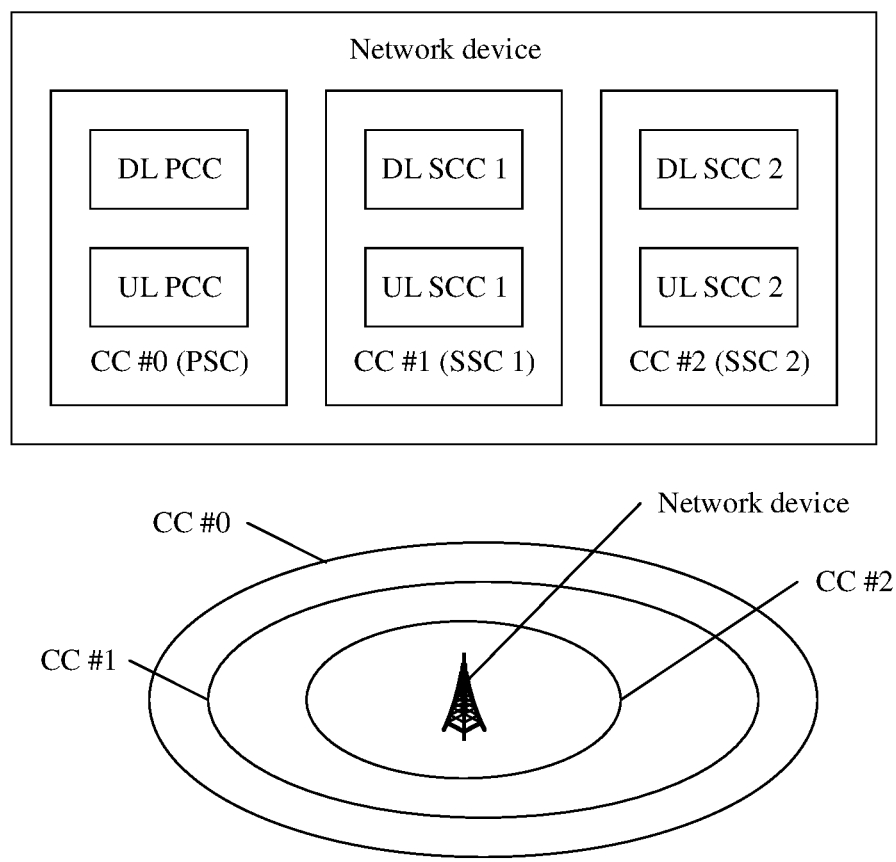
FIG. 3 is a schematic diagram 2 of an SCG in a CA scenario according to an embodiment.

For example, FIG. 3 is a schematic diagram 2 of an SCG in a CA scenario according to an embodiment. As shown in FIG. 3, a primary serving cell (PSC) corresponds to a CC #0, and the CC #0 includes one DL PCC and one UL PCC. A network device establishes an RRC connection to a terminal device, and sends a configuration related to a secondary cell to the terminal device in an RRC connected mode by using higher-layer signaling (for example, RRC signaling). The terminal device obtains the configuration of the secondary cell by using the RRC signaling. A CC #1 is a secondary serving cell and includes one DL SCC and one UL PCC. A CC #2 is a secondary serving cell and includes one DL PCC and one UL PCC. The CC #2 has smallest coverage, the CC #1 has second smallest coverage, and the CC #0 has largest coverage. RRC communication exists only between the primary serving cell and the terminal device. The primary serving cell may also be referred to as a primary cell. Similarly, a secondary serving cell (SSC) may also be referred to as a secondary cell.

3. Search Space Set

The network device configures a search space (SS) set in time domain of a PCell, for example, in one slot. The SS set may be used for scheduling the PCell or an SCell or scheduling both the PCell and the SCell. If a cell is configured as a secondary cell by using RRC, a search space configuration of a PDCCH in the secondary cell includes a search space set index and an nrofCandidates information element. Content of the nrofCandidates information element includes an aggregation level corresponding to the search space set and a number of corresponding PDCCH candidates. When an index of an SS set configured in the PCell is the same as an index of an SS set configured in an SCell, it indicates that a PDCCH for scheduling the SCell may be monitored in the SS set of the PCell.

To determine a CCE position of an SS set that can be used for scheduling the SCell and that is in the PCell, an aggregation level (AL) of the SS set configured in the SCell, a number of corresponding PDCCH candidates, and another related parameter need to be used. To determine a CCE position of an SS set that is used for scheduling the PCell and that is in the PCell, an aggregation level of the SS set configured in the PCell, a number of corresponding PDCCH candidates, and another related parameter need to be used. It can be learned that, when both configuration information of the PCell and configuration information of the SCell include an SS set with a same index, if numbers of PDCCH candidates corresponding to all ALs in configuration information of the SS set in the PCell are 0, it may be considered that the SS set is used for scheduling the SCell. If a number of PDCCH candidates corresponding to at least one AL in configuration information of the SS set in the PCell is not 0, it may be considered that the SS set is used for scheduling both the PCell and the SCell. If an index of an SS set configured in the PCell is not equal to indexes of all SS sets configured in the SCell, it may be considered that the SS set is used for scheduling the PCell.

For example, the network device configures one PCell and one SCell for one terminal device. The PCell is configured with three SS sets with the following indexes:

An SS #1: A number of PDCCH candidates corresponding to at least one configured AL is not 0. For example, a number of PDCCH candidates corresponding to an AL 1 is 4, and numbers of PDCCH candidates corresponding to an AL 2, an AL 4, an AL 8, and an AL 16 are 0. The AL 1 indicates that an aggregation level is 1, a number of CCEs corresponding to a PDCCH candidate is 1; the AL 2 indicates that an aggregation level is 2, a number of CCEs corresponding to a PDCCH candidate is 2; the AL 4 indicates that an aggregation level is 4, a number of CCEs corresponding to a PDCCH candidate is 4; and so on.

An SS #2: Numbers of PDCCH candidates corresponding to all configured ALs are 0. For example, numbers of PDCCH candidates corresponding to the AL 1, the AL 2, the AL 4, the AL 8, and the AL 16 are 0.

An SS #3: A number of PDCCH candidates corresponding to at least one configured AL is not 0. For example, a number of PDCCH candidates corresponding to the AL 16 is 1, and numbers of PDCCH candidates corresponding to the AL 1, the AL 2, the AL 4, and the AL 8 are all 0.

The SCell is configured with two SS sets with the following indexes:

An SS #1: A number of PDCCH candidates corresponding to at least one configured AL is not 0. For example, a number of PDCCH candidates corresponding to an AL 1 is 2, a number of PDCCH candidates corresponding to an AL 2 is 1, and numbers of PDCCH candidates corresponding to an AL 4, an AL 8, and an AL 16 are 0.

An SS #2: A number of PDCCH candidates corresponding to at least one configured AL is not 0. For example, a number of PDCCH candidates corresponding to the AL 1 is 6, and numbers of PDCCH candidates corresponding to the AL 2, the AL 4, the AL 8, and the AL 16 are all 0.

Based on the foregoing configuration, the terminal device needs to monitor all configured SSs in the PCell. Details are as follows:

Because the SS #1 is configured in both the PCell and the SCell, and the number of PDCCH candidates corresponding to the at least one configured AL is not 0, the network device can not only schedule the PCell in the SS #1, and but also schedule the SCell in the SS #1. The terminal device needs to monitor, in the SS #1, both a PDCCH for scheduling the PCell and a PDCCH for scheduling the SCell.

The SS #2 is configured in both the PCell and the SCell. However, the numbers of PDCCH candidates corresponding to all configured ALs of the SS #2 in the PCell are 0, and the number of PDCCH candidates corresponding to at least one AL configured for the SS #2 in the SCell is not 0. Therefore, it may be understood that the SS #2 in the PCell is used for scheduling only the SCell, and the terminal device needs to monitor, in the SS #2 in the PCell, only the PDCCH for scheduling the SCell.

The SS #3 is configured only in the PCell, and the number of PDCCH candidates corresponding to at least one configured AL of the SS #3 in the PCell is not 0. Therefore, it may be understood that the SS #3 in the PCell is used for scheduling only the PCell, and the terminal device needs to monitor, in the SS #3 in the PCell, only the PDCCH for scheduling the PCell.

4. Symbol

Unless otherwise specified, a symbol refers to a time-domain symbol. The time-domain symbol may be an orthogonal frequency division multiplexing (OFDM) symbol or may be a time-domain symbol of another waveform. This is not limited.

It may be understood that the PDCCH and the PDSCH are merely used as examples of a downlink control channel and a downlink data channel and may have different names in different systems. This is not limited.

In an existing solution, DCI of a single cell can be monitored only at a slot granularity, and a solution of monitoring DCI of a plurality of cells at a smaller time granularity is not provided. In other words, the terminal device can monitor the scheduling cell and the scheduled cell one by one only at the slot granularity. This results in low monitoring efficiency.

The following describes in detail a communication method provided in embodiments with reference to FIG. 4 to FIG. 10.

Figure 4:
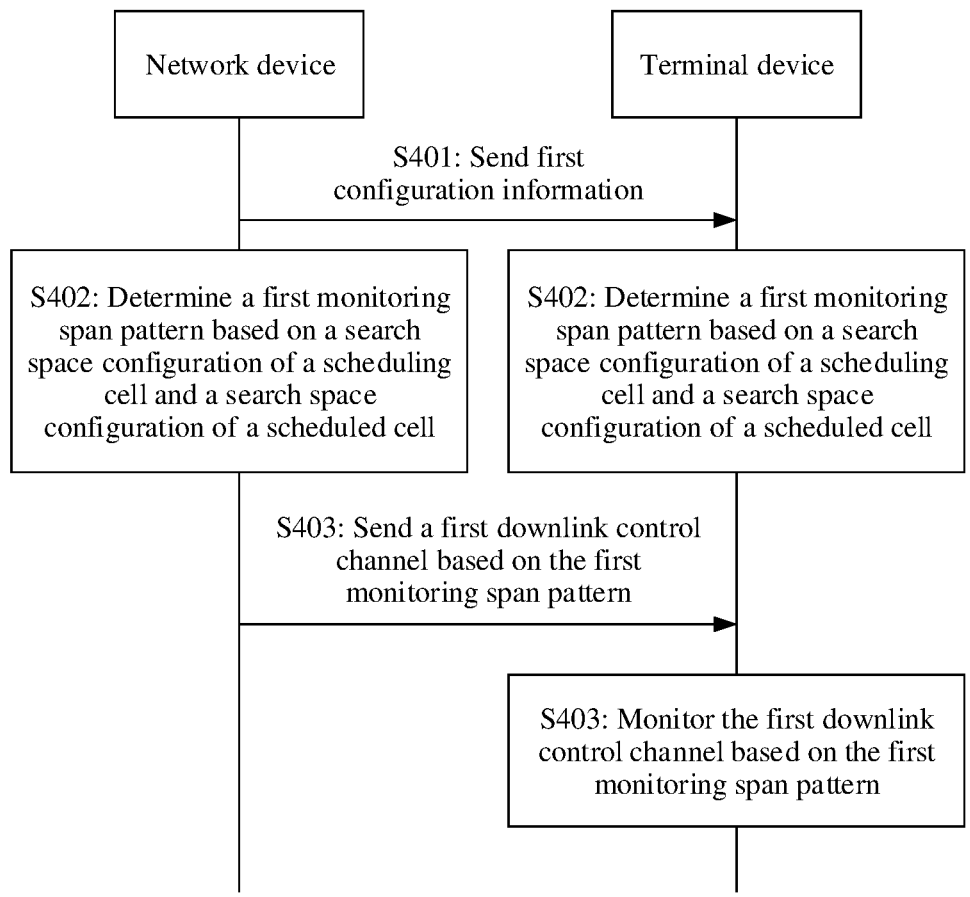
FIG. 4 is a schematic flowchart of a communication method according to an embodiment.

FIG. 4 is a schematic flowchart 1 of a communication method according to an embodiment. The communication method shown in FIG. 4 is applicable to communication between the terminal device and the network device in the communication system shown in FIG. 1. It may be understood that the communication method may be performed by the terminal device and the network device or may be performed by a module that may be used in the terminal device and the network device, for example, a chip. The following provides description by using an example in which the terminal device and the network device are used as execution bodies. As shown in FIG. 4, the communication method includes the following steps.

S401: The network device sends first configuration information to the terminal device. Correspondingly, the terminal device receives the first configuration information from the network device.

For example, the network device may send the first configuration information to the terminal device by using RRC signaling.

The first configuration information includes first indication information and second indication information, the first indication information indicates a search space configuration of a scheduling cell, and the second indication information indicates a search space configuration of at least one scheduled cell corresponding to the scheduling cell. Optionally, the first indication information may further indicate a CORESET configuration. S402: The network device determines a first monitoring span pattern based on the search space configuration of the scheduling cell and the search space configuration of the scheduled cell. Correspondingly, the terminal device may also determine the first monitoring span pattern based on the search space configuration of the scheduling cell and the search space configuration of the scheduled cell.

The first monitoring span pattern includes N monitoring spans in a first time unit, and N is a positive integer. The first time unit may be a slot, may be a subframe or a radio frame, or may be another time unit. This is not limited.

In a method, the determining a first monitoring span pattern based on the search space configuration of the scheduling cell and the search space configuration of the scheduled cell includes: determining a second monitoring span pattern of the scheduling cell based on the search space configuration of the scheduling cell, where the second monitoring span pattern includes N1 monitoring spans in the first time unit, and N1 is a positive integer; determining a third monitoring span pattern of a first scheduled cell based on a search space configuration of the first scheduled cell, where the third monitoring span pattern includes N2 monitoring spans in the first time unit, N2 is a positive integer, and the first scheduled cell is one scheduled cell in the scheduled cell; and determining the N monitoring spans based on the N1 monitoring spans and the N2 monitoring spans.

Optionally, the determining the N monitoring spans based on the N1 monitoring spans and the N2 monitoring spans may include: when a $j^{th}$ monitoring span in the N1 monitoring spans and a $k^{th}$ monitoring span in the N2 monitoring spans partially overlap, completely overlap, or are connected head-to-tail, determining that a $t^{th}$ monitoring span in the N monitoring spans meets the following condition: An index of a start symbol of the $t^{th}$ monitoring span is less than or equal to an index of a start symbol of the $j^{th}$ monitoring span, and is less than or equal to an index of a start symbol of the $k^{th}$ monitoring span; and an index of an end symbol of the $t^{th}$ monitoring span is greater than or equal to an index of an end symbol of the $j^{th}$ monitoring span, and is greater than or equal to an index of an end symbol of the $k^{th}$ monitoring span. A number of consecutive time-domain symbols included in the $t^{th}$ monitoring span is equal to a value of Y of at least one monitoring span pattern in a PDCCH monitoring capability report reported by the terminal device. j is a positive integer less than or equal to N1, k is a positive integer less than or equal to N2, and t is a positive integer less than or equal to N.

In another method, the first configuration information is carried in an RRC connection reconfiguration message. Correspondingly, when a time length of the $t^{th}$ monitoring span is greater than a maximum value of a monitoring span defined in a protocol, or when the first monitoring span pattern does not meet a monitoring capability reported by the terminal device to the network device, the terminal device may send an RRC connection reconfiguration failure message to the network device.

Figure 5:
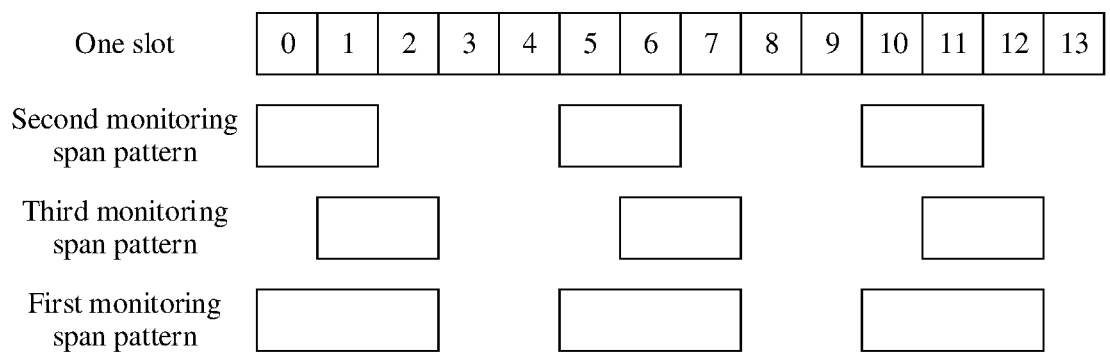
FIG. 5 is a schematic diagram 1 of a scenario of a pattern combination solution according to an embodiment.

For example, FIG. 5 is a schematic diagram 1 of a scenario in which a plurality of monitoring span patterns in one slot are combined according to an embodiment. As shown in FIG. 5, it is assumed that monitoring capabilities indicated by second capability reports separately reported by the terminal device in a scheduling cell CC 1 and a sched- uled cell CC 2 are both (X, Y)={(7,3), (4,3)}. In this case, it is determined, based on an SS set used for scheduling the scheduling cell CC 1 and information about an associated CORESET that are in the first configuration information, that a second monitoring span pattern corresponding to the scheduling cell CC 1 is a second monitoring span pattern shown in FIG. 5, a monitoring capability that can be met is (4, 3), and there are a total of three monitoring spans in one slot. Similarly, the terminal device determines, based on an SS set used for scheduling the scheduled cell CC 2 and information about an associated CORESET that are in the first configuration information, that a third monitoring span pattern corresponding to the scheduled cell CC 2 is a third monitoring span pattern shown in FIG. 5, a monitoring capability that can be met is also (4, 3), and there are a total of three monitoring spans in one slot. For a first monitoring span corresponding to the scheduling cell CC 1, an index of a start symbol is 0, and an index of an end symbol is 1. For a first monitoring span corresponding to the scheduled cell CC 2, an index of a start symbol is 1, and an index of an end symbol is 2. In other words, the first monitoring span corresponding to the scheduling cell CC 1 partially overlaps the first monitoring span corresponding to the scheduled cell CC 2, the index of the start symbol of the first monitoring span corresponding to the scheduling cell CC 1 is less than the index of the start symbol of the first monitoring span corresponding to the scheduled cell CC 2, and the index of the end symbol of the first monitoring span corresponding to the scheduling cell CC 1 is less than the index of the end symbol of the first monitoring span corresponding to the scheduled cell CC 2. Therefore, the first monitoring span corresponding to the scheduling cell CC 1 and the first monitoring span corresponding to the scheduled cell CC 2 may be combined into a first monitoring span in a first monitoring span pattern in the scheduling cell. Similarly, a second monitoring span corresponding to the scheduling cell CC 1 and a second monitoring span corresponding to the scheduled cell CC 2 may be combined into a second monitoring span in the first monitoring span pattern, and a third monitoring span corresponding to the scheduling cell CC 1 and a third monitoring span corresponding to the scheduled cell CC 2 may be combined into a third monitoring span in the first monitoring span pattern. After all monitoring spans are combined to obtain a new monitoring span, a monitoring span pattern (X, Y) in the scheduling cell is a first monitoring span pattern (5, 3) shown in FIG. 5, a monitoring capability that can be met is (4, 3), and there are a total of three monitoring spans in one slot.

Figure 6:
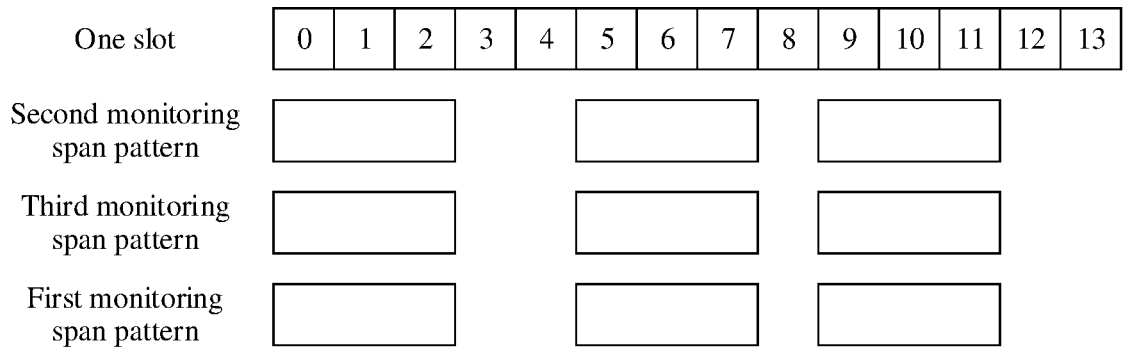
FIG. 6 is a schematic diagram 2 of a scenario in which a plurality of monitoring span patterns in one slot are combined according to an embodiment.

For example, FIG. 6 is a schematic diagram 2 of a scenario in which a plurality of monitoring span patterns in one slot are combined according to an embodiment. As shown in FIG. 6, it is assumed that the terminal device separately reports second capability reports in the scheduling cell CC 1 and the scheduled cell CC 2, and the second capability reports are both (X, Y)={(7,3), (4,3)}. As shown in FIG. 6, a second monitoring span pattern corresponding to the scheduling cell includes N1 monitoring spans, where N1 is equal to 3. A third monitoring span pattern corresponding to the scheduled cell includes N2 monitoring spans, where N2 is equal to 3. A monitoring span corresponding to the scheduling cell CC 1 and a monitoring span corresponding to the scheduled cell CC 2 that completely overlap in time domain may be combined into a monitoring span in a first monitoring span pattern in the scheduling cell. A first monitoring span pattern obtained through combination includes N monitoring spans, where N is equal to 3.

Figure 7:
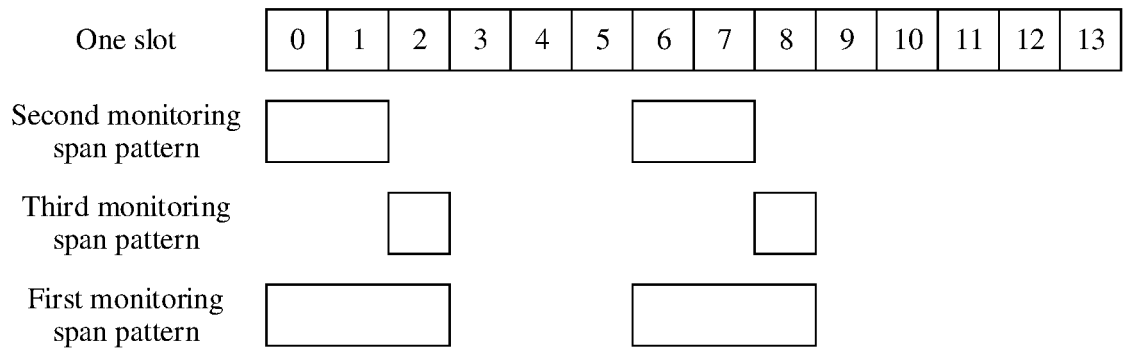
FIG. 7 is a schematic diagram 3 of a scenario in which a plurality of monitoring span patterns in one slot are combined according to an embodiment.

For example, FIG. 7 is a schematic diagram 3 of a scenario in which a plurality of monitoring span patterns in one slot are combined according to an embodiment. As shown in FIG. 7, it is assumed that monitoring capabilities indicated by second capability reports separately reported by the terminal device in the scheduling cell CC 1 and the scheduled cell CC 2 are both (X, Y)={(7,3), (4,3)}. As shown in FIG. 7, a second monitoring span pattern is (6, 2). The second monitoring span pattern includes two monitoring spans, a symbol interval between the two monitoring spans includes six symbols, a length of each monitoring span includes two symbols, and a monitoring capability that can be met is (4, 3). {Indexes of start symbols, indexes of end symbols} of the two monitoring spans in the second monitoring span pattern are {0, 1} and {6, 7}. A third monitoring span pattern is (6, 1). The third monitoring span pattern includes two monitoring spans, a symbol interval between the two monitoring spans includes six symbols, a length of each monitoring span includes one symbol, and a monitoring capability that can be met is (4, 3). {Indexes of start symbols, indexes of end symbols} of the two monitoring spans in the third monitoring span pattern are {2, 2} and {8, 8}. Although the second monitoring span pattern and the third monitoring span pattern do not overlap at all, an end symbol of a first monitoring span in the second monitoring span pattern is connected to a start symbol of a first monitoring span in the third monitoring span pattern head-to-tail. Therefore, the first monitoring span in the second monitoring span pattern and the first monitoring span in the third monitoring span pattern meet a combination condition, and may be combined into one monitoring span, such as a first monitoring span {0, 2} in the first monitoring span pattern in FIG. 6. Similarly, a second monitoring span in the second monitoring span pattern and a second monitoring span in the third monitoring span pattern may also be combined into a second monitoring span {6, 8} in the first monitoring span pattern in FIG. 6. In conclusion, a first monitoring span pattern obtained through combination is (6, 3), and a monitoring capability that can be met is (4, 3). Therefore, a PDCCH monitoring capability corresponding to the monitoring span pattern (6, 3) is determined as a first monitoring capability.

It should be noted that the monitoring span pattern obtained through combination needs to meet the monitoring capability reported by the terminal device to the network device. For example, (X, Y) is one or more values in a set {(7,3), (4,3), (2,2)}. In other words, although two monitoring spans that meet a condition of head-to-tail connection in two monitoring span patterns may be combined into one new monitoring span, a monitoring span pattern formed by monitoring spans obtained through combination may not meet the monitoring capability reported by the terminal device to the network device. That the monitoring capability reported by the terminal device to the network device is not met means that a monitoring span pattern does not meet any monitoring capability defined in a set (X, Y). The set (X, Y) herein represents the monitoring capability reported by the terminal device to the network device. Further, that the monitoring capability reported by the terminal device to the network device is not met may be understood as that a symbol interval between two adjacent monitoring spans in a monitoring span pattern is less than any value of X in the set (X, Y), or a time length of a monitoring span in the monitoring span pattern is greater than a maximum value of Y in the set (X, Y). Alternatively, that the monitoring capability reported by the terminal device to the network device is not met may be understood as that a monitoring capability matching the monitoring span pattern cannot be found in the set (X, Y), so that the time length of the monitoring span is less than or equal to Y, and a minimum value of the symbol interval between the two adjacent monitoring spans is greater than or equal to X.

Figure 8:
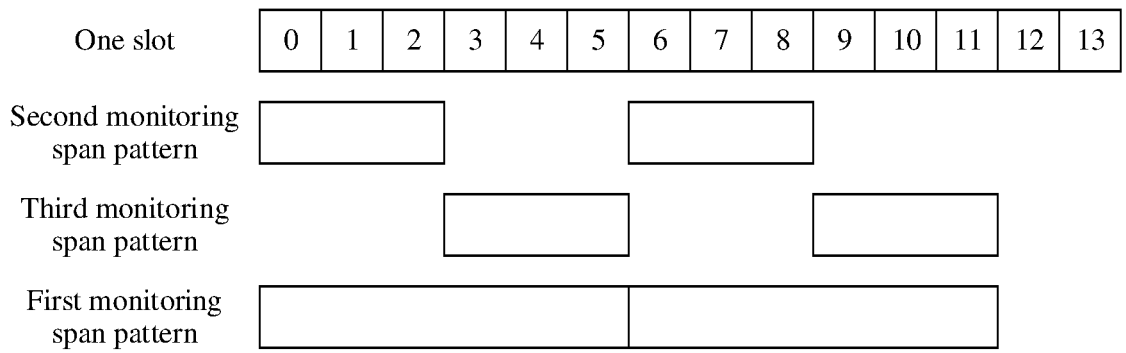
FIG. 8 is a schematic diagram 4 of a scenario in which a plurality of monitoring span patterns in one slot are combined according to an embodiment.

For example, FIG. 8 is a schematic diagram 4 of a scenario in which a plurality of monitoring span patterns in one slot are combined according to an embodiment. As shown in FIG. 8, it is assumed that monitoring capabilities indicated by second capability reports separately reported by the terminal device in the scheduling cell CC 1 and the scheduled cell CC 2 are both (X, Y)={(7,3), (4,3)}. As shown in FIG. 8, a second monitoring span pattern is (6, 3). The second monitoring span pattern may include two monitoring spans, a symbol interval between the two monitoring spans includes six symbols, a length of each monitoring span includes three symbols, and a monitoring capability that can be met is (6, 3). {Indexes of start symbols, indexes of end symbols} of the two monitoring spans in the second monitoring span pattern are {0, 2} and {6, 8}. A third monitoring span pattern is (6, 3). The third monitoring span pattern may include two monitoring spans, a symbol interval between the two monitoring spans includes six symbols, a length of each monitoring span includes three symbols, and a monitoring capability that can be met is (6, 3). {Indexes of start symbols, indexes of end symbols} of the two monitoring spans in the third monitoring span pattern are {3, 5} and {9, 11}. Although the second monitoring span pattern and the third monitoring span pattern do not overlap at all, an end symbol (a symbol 2) of a first monitoring span in the second monitoring span pattern is connected to a start symbol (a symbol 3) of a first monitoring span in the third monitoring span pattern head-to-tail. If the first monitoring span in the second monitoring span pattern and the first monitoring span in the third monitoring span pattern are combined into one monitoring span {0, 5}, and a second monitoring span in the second monitoring span pattern and a second monitoring span in the third monitoring span pattern are combined into one monitoring span {6, 11}, a first monitoring span pattern obtained through combination is (6, 6), and the first monitoring span pattern cannot meet monitoring capabilities (4, 3) and (7, 3). Therefore, the second monitoring span pattern and the third monitoring span pattern in this scenario cannot be combined by using this method.

Figure 9:
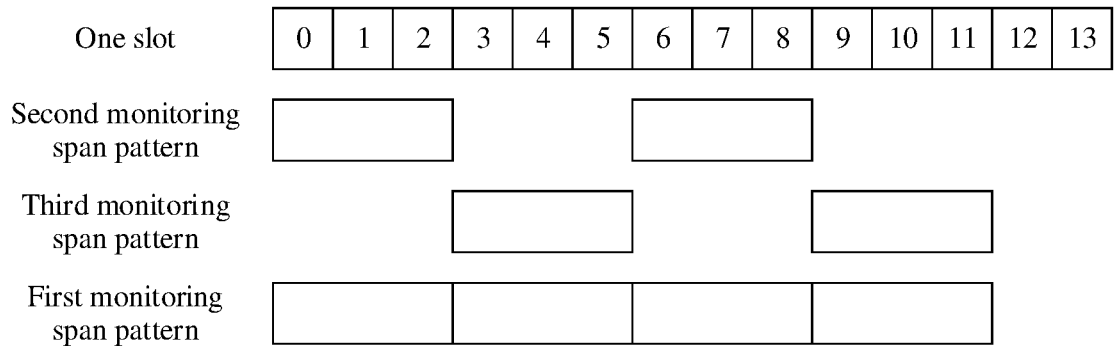
FIG. 9 is a schematic diagram 5 of a scenario in which a plurality of monitoring span patterns in one slot are combined according to an embodiment.

In this case, two head-to-tail connected monitoring span patterns may be fused into one monitoring span pattern, and each of the two monitoring span patterns is used as an independent monitoring span in a monitoring span pattern obtained through combination. As shown in FIG. 9, the first monitoring span pattern includes four monitoring spans in total, and {indexes of start symbols, indexes of end symbols} of a first monitoring span to a fourth monitoring span are sequentially {0, 2}, {3, 5}, {6, 8}, and {9, 11}. A first monitoring span pattern obtained through combination is (3, 3). Therefore, a PDCCH monitoring capability corresponding to the monitoring span pattern (3, 3) is determined as the first monitoring capability.

In another method, the determining a first monitoring span pattern based on the search space configuration of the scheduling cell and the search space configuration of the scheduled cell includes: determining the first monitoring span pattern of the scheduling cell based on the search space configuration of the scheduling cell and the CORESET configuration. Each monitoring span in the first monitoring span pattern may be used for monitoring the scheduling cell or the scheduled cell.

After a position of each monitoring span in the first monitoring span pattern is determined, an actual monitoring capability may be determined for each monitoring span in the first monitoring span pattern. For details, refer to the following related content in S403.

S403: The network device sends a first downlink control channel to the terminal device based on the first monitoring span pattern. Correspondingly, the terminal device monitors the first downlink control channel based on the first monitoring span pattern.

The first downlink control channel carries downlink control information of the scheduling cell or downlink control information of the scheduled cell corresponding to the scheduling cell.

In another method, that the network device sends a first downlink control channel to the terminal device based on the first monitoring span pattern in S403 may include: The network device determines the first monitoring capability based on the search space configuration of the scheduling cell, the search space configuration of the scheduled cell, and information about a capability supported by the terminal device, or based on information about a capability supported by the terminal device. The first monitoring capability includes a monitoring capability of monitoring the first downlink control channel by the terminal device in each of the N monitoring spans. Further, the network device sends the first downlink control channel based on the first monitoring capability.

Correspondingly, that the terminal device monitors the first downlink control channel based on the first monitoring span pattern may include: The terminal device determines the first monitoring capability based on the search space configuration of the scheduling cell, the search space configuration of the scheduled cell, and the information about the capability supported by the terminal device or based on the information about the capability supported by the terminal device. Further, the terminal device monitors the first downlink control channel based on the first monitoring capability.

For example, the information about the capability supported by the terminal device may include one or more of the following: information about a capability indicated by a first capability report and information about a capability indicated by the second capability report. The first capability report is used for indicating the information about the capability supported by the terminal device, and the first capability report includes a mapping relationship between a reference number of cells for downlink control channel blind detection (reference number of cells for downlink control channel blind detection) and the monitoring capability of the terminal device in each of the N monitoring spans. The second capability report is used for indicating the information about the capability supported by the terminal device, and the second capability report includes a monitoring capability of monitoring a downlink control channel of one cell by the terminal device in each of the N monitoring spans. The terms "cell" and "carrier" are not strictly distinguished and may be interchanged. The reference number of cells for downlink control channel blind detection may also be referred to as a reference number of carriers for downlink control channel blind detection.

In this embodiment, the information about the capability supported by the terminal device is a capability of performing blind detection on a PDCCH by the terminal device, or a capability of monitoring a PDCCH by the terminal device. It should be noted that because complexity of PDCCH detection is high, power consumption of the terminal device is high. Therefore, in a 5G communication system, a PDCCH monitoring capability corresponding to one slot or one span may be set or may be referred to as a PDCCH blind detection capability corresponding to one slot or one span. A monitoring capability of monitoring a downlink control channel in one slot or one span may include: (1) a maximum number of monitoring times of monitoring the PDCCH by the terminal device in one slot or one span, and/or (2) a maximum number of CCEs used by the terminal device to perform channel estimation in one slot or one span. In (1), the number of monitoring times is a number of monitored PDCCH candidates. For example, if a number of PDCCH candidates configured for an aggregation level 2 is 3, and one PDCCH format needs to be detected for each PDCCH candidate, a number of monitoring times at the aggregation level 2 is 3*1=3. For example, the maximum number of monitoring times of monitoring the PDCCH in one slot or one span may be a maximum number of monitoring times that the terminal device can bear in one slot or one span. In (2), DCI may be affected by a radio channel environment in a transmission process, and this greatly affects transmission performance. Therefore, before monitoring, the terminal device needs to perform channel estimation on a pilot inserted in the PDCCH, to counteract impact of a radio channel on signal transmission and restore a transmitted signal of the network device as accurately as possible. Because a PDCCH resource is allocated in a minimum unit of CCE, the terminal device also performs channel estimation in the unit of CCE. For example, the maximum number of CCEs used by the terminal device to perform channel estimation in one slot or one span is a maximum number of CCEs that can be used by the terminal device to perform channel estimation in one slot or one span.

The first capability report indicates, for a monitoring span pattern, a mapping relationship between a reference number of cells for PDCCH blind detection and a monitoring capability in each monitoring span in the monitoring span pattern. The monitoring capability may include an upper limit of a number of blind detection times and/or an upper limit of a number of non-overlapping CCEs used for channel estimation. The upper limit of the number of non-overlapping CCEs used for channel estimation is referred to as a CCE upper limit for short. The reference number of cells for PDCCH blind detection is a reference parameter reported by the terminal device, and the network device needs to refer to the reporting capability value when configuring the PDCCH for the terminal device. The reference cell may be used for calculating a total blind detection capability in a multi-cell or multi-carrier scenario. It may be assumed that in the multi-cell or multi-carrier scenario, a total number of blind detection times and a number of configured cells or a number of activated cells are in a linear increasing relationship. The total number of blind detection times may be equal to a sum of the number of configured cells or the number of activated cells and a product of a number of blind detection times corresponding to one cell or a number of blind detection times corresponding to one carrier. For example, it is assumed that the number of blind detection times corresponding to one cell or one carrier is 44, the terminal device sends a PDCCH capability report to the network device, to notify that a blind detection capability or a PDCCH monitoring capability supports four cells or four activated cells. When configuring a PDCCH candidate for the terminal device, the network device refers to the PDCCH capability report sent by the terminal device, that is, 4*44 blind detection times. Therefore, a number of blind detection times corresponding to a PDCCH candidate that actually configured by the network device may be equal to 4*44, or may be less than 4*44, for example, equal to 2*44. The network device ensures that the number of blind detection times corresponding to the configured PDCCH candidate does not exceed the upper limit of the number of PDCCH blind detection times corresponding to the PDCCH capability report sent by the terminal device. A description about the number of non-overlapping CCEs used for channel estimation is similar, and details are not described herein again.

It should be noted that the terminal device reports that three cells are supported for a span pattern (2, 2). When configuring the PDCCH for the terminal device, the network device may configure the PDCCH based on an upper limit of a number of blind detection times corresponding to three cells or may configure the PDCCH based on an upper limit of a number of blind detection times corresponding to fewer than three cells. It should be noted that the reference number of cells for PDCCH blind detection does not affect a number of cells configured by the network device for the terminal device. In other words, the number of cells configured by the network device may be greater than the reference number of cells for PDCCH blind detection. For example, the terminal device reports that a reference number of cells for PDCCH blind detection for the span pattern (2, 2) is 3, but the network device may configure four cells for the terminal device.

For example, Table 1 to Table 3 show three examples of the information about the capability indicated by the first capability report. Table 1 shows a mapping relationship between a reference number of cells for PDCCH blind detection in a CA scenario and an upper limit of a number of CCEs corresponding to one monitoring span in different monitoring span patterns. As shown in Table 1, it is assumed that a monitoring span pattern (X, Y) corresponding to the scheduling cell is (2, 2). If the reference number of cells for PDCCH blind detection is 3, an upper limit of a number of non-overlapping CCEs used for channel estimation that corresponds to the monitoring span pattern (2, 2) corresponding to the scheduling cell is 56.

Table 2 shows a mapping relationship between a reference number of cells for PDCCH blind detection in a CA scenario and an upper limit of a number of BD times corresponding to one monitoring span in different monitoring span patterns. As shown in Table 2, it is assumed that a monitoring span pattern (X, Y) corresponding to the scheduling cell is (2, 2). If the reference number of cells for PDCCH blind detection is 3, an upper limit of a number of blind detection times that corresponds to the monitoring span pattern (2, 2) corresponding to the scheduling cell is 14.

Table 3 shows a mapping relationship between a reference number of cells for PDCCH blind detection in a CA scenario, an upper limit of a number of BD times corresponding to one monitoring span in different monitoring span patterns, and an upper limit of a number of non-overlapping CCEs used for channel estimation that corresponds to the monitoring span in different monitoring span patterns. In other words, content in Table 3 may be a combination of content in Table 1 and Table 2. As shown in Table 3, it is assumed that a monitoring span pattern (X, Y) corresponding to the scheduling cell is (2, 2). If a reference number of cells for PDCCH blind detection is 3, an upper limit of a number of blind detection times that corresponds to the monitoring span pattern (2, 2) corresponding to the scheduling cell is 14, and an upper limit of a number of corresponding non-overlapping CCEs used for channel estimation is 56.

It should be noted that Table 1 to Table 3 provide upper limits of a number of BD times and/or upper limits of a number of CCEs in scenarios in which reference numbers of cells for PDCCH blind detection is 2 and 3. It is easy to understand that in a scenario in which a reference number of cells for PDCCH blind detection is greater than 3, for example, 4, a corresponding upper limit of a number of BD times and/or upper limit of a number of CCEs may also be determined according to the method provided in this embodiment. Details are not described again.

TABLE 1

| Reference number of cells for PDCCH | Monitoring span pattern (X, Y) | | |
|---|---|---|---|
| blind detection | (2, 2) | (4, 3) | (7, 3) |
| 2 | 42 | 54 | 84 |
| 3 | 56 | 72 | 112 |

TABLE 2

| Reference number of cells for PDCCH | Monitoring span pattern (X, Y) | | |
|---|---|---|---|
| blind detection | (2, 2) | (4, 3) | (7, 3) |
| 2 | 10 | 22 | 32 |
| 3 | 14 | 30 | 44 |

TABLE 3

| Reference number of cells for PDCCH | Monitoring span pattern (X, Y) | | |
|---|---|---|---|
| blind detection | (2, 2) | (4, 3) | (7, 3) |
| 2 | 10/42 | 22/54 | 32/84 |
| 3 | 14/56 | 30/72 | 44/112 |

For example, Table 4 is an example of the information of the capability indicated by the second capability report. The second capability report includes a capability of monitoring a downlink control channel of one cell by the terminal device in one monitoring span. The monitoring span herein may be equal to or less than one slot. Table 4 shows a mapping relationship between a monitoring span pattern and a monitoring capability of monitoring a PDCCH of one cell in one monitoring span in the monitoring span pattern. The monitoring capability herein is a corresponding upper limit of a number of CCEs. The one cell herein may be one cell in a single-carrier scenario or may be a primary component carrier cell or a secondary component carrier cell in the CA scenario. As shown in Table 4, it is assumed that a monitoring span pattern (X, Y) corresponding to the scheduling cell is (2, 2), and a subcarrier spacing is 15 kHz. In this case, it may be determined that an upper limit of a number of CCEs corresponding to each monitoring span pattern is 28.

TABLE 4

| | | Monitoring capability | |
|---|---|---|---|
| | (X, Y) | 15 kHz subcarrier spacing | 30 kHz subcarrier spacing |
| Monitoring span pattern 1 | (2, 2) | 28 | 28 |
| Monitoring span pattern 2 | (4, 3) | 36 | 36 |

TABLE 4-continued

| | | Monitoring capability | |
| | (X, Y) | 15 kHz subcarrier spacing | 30 kHz subcarrier spacing |
|---|---|---|---|
| Monitoring span pattern 3 | (7, 3) | 56 | 56 |

In another method, the first monitoring capability may be a monitoring capability indicated by the first capability report.

For example, for the terminal device, the determining the first monitoring capability based on the information about the capability supported by the terminal device may include: The terminal device determines a reference number of cells for downlink control channel blind channel detection in each monitoring span in the first monitoring span pattern, and queries, based on the reference number, the mapping relationship locally cached, for example, a mapping relationship table, to determine the first monitoring capability. The first monitoring capability is the monitoring capability of the terminal device in each of the N monitoring spans. In other words, the monitoring capability indicated by the first capability report is determined as the first monitoring capability.

For example, for the network device, the determining the first monitoring capability based on the information about the capability supported by the terminal device includes: The network device receives the first capability report from the terminal device. Then, the network device determines the reference number of cells for downlink control channel blind channel detection in each monitoring span in the first monitoring span pattern and determines the first monitoring capability based on the reference number and the foregoing mapping relationship. The first monitoring capability is the monitoring capability of the terminal device in each of the N monitoring spans. In other words, the monitoring capability indicated by the first capability report is determined as the first monitoring capability.

In another embodiment, the network device and the terminal device may alternatively determine the first monitoring capability based on the second capability report. The second capability report indicates a monitoring capability of monitoring a downlink control channel of one cell by the terminal device in each monitoring span. It is assumed that the monitoring capability is C1. After a number of carriers that need to be monitored in each monitoring span in the first monitoring span pattern is determined, the first monitoring capability may be determined in any one of the following manners.

Manner 1: The first monitoring capability may be r*C1. r is a positive real number greater than 1.

For example, it is assumed that the terminal device determines, based on configuration information of the scheduling cell, that the monitoring span pattern (X, Y) of the scheduling cell is (2, 2). It can be learned based on the second capability report that, for a single CC, a monitoring capability upper limit C1 corresponding to each monitoring span is 28. If the terminal device determines, based on the first configuration information, that three cells are configured or activated, where one cell is a scheduling cell, and two cells are scheduled cells, the terminal device may further determine that a monitoring capability upper limit corresponding to each monitoring span in the scheduling cell is r*C1, where r is a positive real number greater than 1. For example, r=3. r may alternatively be a value related to the scheduling cell and the scheduled cell. For example, for the scheduling cell, r=1, and for the scheduled cell, r=0.5. The terminal device may determine that the monitoring capability corresponding to each monitoring span in the scheduling cell is 1*C1+2*0.5*C1, the monitoring capability corresponding to each monitoring span is 56.

Manner 2: The first monitoring capability may include a monitoring capability $C(i)$ in an $i^{th}$ monitoring span in the N monitoring spans, where i is a positive integer less than or equal to N. $C(i)=r1*C1+M(i)*r2*C1$. $M(i)$ is a number of scheduled cells that correspond to the scheduling cell and that are configured in the $i^{th}$ monitoring span, and r1 and r2 are real numbers less than or equal to 1 and greater than 0. In some special cases, r2 may alternatively be equal to 0.

Manner 3: The first monitoring capability includes a monitoring capability $C(i)$ in an $i^{th}$ monitoring span in the N monitoring spans, where i is a positive integer less than or equal to N. When no search space of the scheduling cell is configured in the $i^{th}$ monitoring span, $C(i)=M(i)*r2*C1$. When only a search space of the scheduling cell is configured in the $i^{th}$ monitoring span, $C(i)=r1*C1$. When both a search space of the scheduling cell and a search space of the scheduled cell are configured in the $i^{th}$ monitoring span, $C(i)=C1+M(i)*r2*C1$. $M(i)$ is a number of scheduled cells that correspond to the scheduling cell and that are configured in the $i^{th}$ monitoring span, and r2 is a real number less than or equal to 1 and greater than 0.

For example, it is assumed that the terminal device determines, based on a first configuration information, that there are three monitoring spans in one slot of the scheduling cell, a corresponding monitoring span pattern (X, Y) is (4, 3), and a monitoring capability upper limit C1 corresponding to each monitoring span on a single CC is 36. When both a search space set for scheduling the scheduling cell and search space sets for scheduling the two scheduled cells are configured in a first monitoring span, it is assumed that r1 is equal to 1 and r2 is equal to 0.5, a monitoring capability upper limit corresponding to the first monitoring span is $C(1)=r1*C1+M(1)*r2*C1=1*48+2*0.5*48$, that is, 96. Similarly, when only a search space set for scheduling the scheduling cell is configured in a second monitoring span, a monitoring capability upper limit corresponding to the second monitoring span is 0*48+1*0.5*48, that is, 24. Similarly, when a search space set for scheduling the scheduling cell and a search space set for scheduling one scheduled cell are configured in a third monitoring span, a monitoring capability upper limit corresponding to the third monitoring span is 1*48+0*0.5*48, that is, 48. Then, the terminal device may monitor a PDCCH in each monitoring span based on a corresponding monitoring capability upper limit. A search space set that may also be understood as a PDCCH monitoring occasion is configured.

Further, a maximum value max{C(i)} in monitoring capabilities corresponding to all monitoring spans that is obtained in the manner 2 or manner 3 may be used as the first monitoring capability. Therefore, for the manner 2 and manner 3, max{C(i)}=max{96, 48, 24}=96 may be determined as the first monitoring capability. It should be noted that once 96 is determined as the first monitoring capability, it may be determined that monitoring capability upper limits corresponding to all the monitoring spans are 96. A maximum value in monitoring capabilities of all monitoring spans in a monitoring span pattern is used as a monitoring capability in each monitoring span in the monitoring span pattern. This can avoid that different monitoring spans in one monitoring span pattern has different monitoring capability values. Therefore, the manner 2 may be further improved into a manner 4, and the manner 3 may be further improved into a manner 5. Descriptions are separately provided below.

Manner 4: The first monitoring capability may be max{C(i)}. C(i) is a monitoring capability in an $i^{th}$ monitoring span in the N monitoring spans. For a definition of C(i), refer to related descriptions in the manner 2.

Manner 5: The first monitoring capability may be max{C(i)}. C(i) is a monitoring capability in an $i^{th}$ monitoring span in the N monitoring spans. For a definition of C(i), refer to related descriptions in the manner 3.

It should be noted that in each monitoring span, it is configured that a scale factor r1 corresponding to the scheduling cell and/or a scale factor r2 corresponding to the scheduled cell may change with an index of a monitoring span, that is, r1(i) and r2(i), where i is an index of a monitoring span in one slot, and a value ranges from 1 to N. Correspondingly, r1 in the manner 1 to manner 5 may be replaced with r1(i), and similarly, r2 may be replaced with r2(i). A formula may be obtained with reference to the manner 2 to manner 5. When a calculated value of the first monitoring capability in any one of the manner 2 to manner 5 is a decimal, a rounding operation may be performed on the decimal to obtain a final first monitoring capability. The rounding operation herein may be rounding up, rounding down, or rounding off.

For example, the manner 2 is used as an example. It is assumed that N=7, r1(1)=1, r1(2)=0.9, r1(3)=0.8, r1(4)=0.7, r1(5)=0.6, r1(6)=0.5, and r1(7)=0.4; and r2(1)=0.5, r2(2)=0.45, r2(3)=0.4, r2(4)=0.35, r2(5)=0.3, r2(6)=0.25, and r2(7)=0.2. It is assumed that the terminal device determines, based on the first configuration information, that there are three monitoring spans in one slot of the scheduling cell, a corresponding monitoring span pattern (X, Y) is (4, 3), and a monitoring capability upper limit C1 corresponding to each monitoring span on a single CC is 36. When the terminal device determines that both a search space set for scheduling the scheduling cell and search space sets for scheduling the two scheduled cells are configured in a first monitoring span, a monitoring capability upper limit corresponding to the first monitoring span is C(1)=r1(1)*C1+M(1)*r2*C1=1*48+2*0.5*48, that is, 96. When the terminal device determines that only a search space set for scheduling the scheduling cell is configured in a second monitoring span, a monitoring capability upper limit corresponding to the second monitoring span is 1*48+0*0.45*48, that is, 48. When the terminal device determines that a search space set for scheduling one scheduled cell is configured in a third monitoring span, a monitoring capability upper limit corresponding to the third monitoring span is 0*48+1*0.4*48, that is, 19.2. A rounding up operation or a rounding down operation may be performed on the monitoring capability upper limit to obtain 20 or 19. In this case, the terminal device may monitor the PDCCH in each monitoring span based on a corresponding monitoring capability upper limit.

Further, similar to the manner 4 and the manner 5, a maximum value max{C(i)} in determined monitoring capability upper limits corresponding to all the monitoring spans, that is, max{96, 48, 20}=96, may be determined as the first monitoring capability. The monitoring capability upper limits corresponding to all the monitoring spans may be 96.

Figure 10:
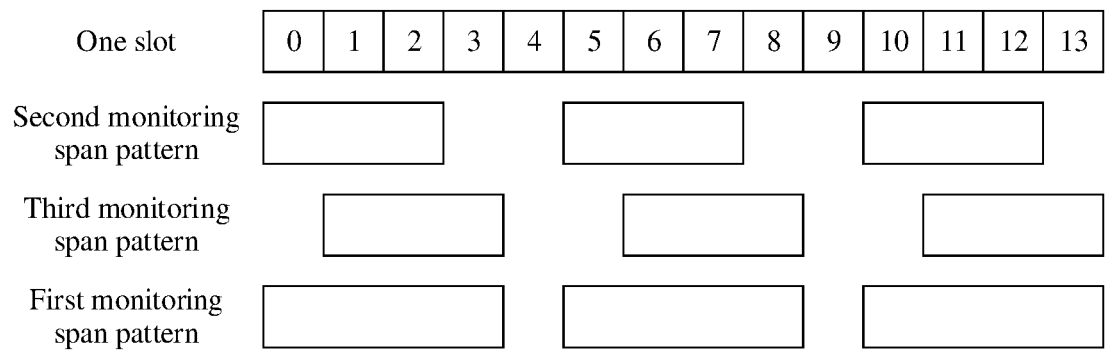
FIG. 10 is a schematic diagram of a scenario in which a pattern obtained through combination is an invalid configuration according to an embodiment.

For example, FIG. 10 is a schematic diagram of a scenario in which a pattern obtained through combination is an invalid configuration according to an embodiment. As shown in FIG. 10, the terminal device separately determines, based on the configuration information of the scheduling cell and configuration information of the scheduled cell, a monitoring span pattern corresponding to each cell. It is assumed that the terminal device separately reports second capability reports in the scheduling cell CC 1 and the scheduled cell CC 2, and the second capability reports are both {(7,3), (4,3)}. As shown in FIG. 10, a second monitoring span pattern corresponding to the scheduling cell includes N1 monitoring spans, where N1 is equal to 3. A third monitoring span pattern corresponding to the scheduled cell includes N2 monitoring spans, where N2 is equal to 3. A monitoring span corresponding to the scheduling cell CC 1 and a monitoring span corresponding to the scheduled cell CC 2 that partially overlap in time domain may be combined into a monitoring span in a first monitoring span pattern in the scheduling cell. A first monitoring span pattern obtained through combination includes N monitoring spans, where N is equal to 3. After all monitoring spans are combined to obtain a new monitoring span, a monitoring span pattern (X, Y) in the scheduling cell is (5, 4). Because a number of consecutive time-domain symbols included in a first monitoring span is equal to 4, 4 is not a value of Y corresponding to any monitoring span in the PDCCH capability report sent by the terminal device. The value of Y herein is a number of consecutive time-domain symbols that is included in a monitoring span and that is supported by the terminal device. The methods described in the manner 1 to manner 5 may be used for determining a monitoring capability upper limit corresponding to each monitoring span. Therefore, the terminal device considers that the first configuration information is invalid information and sends an RRC connection reconfiguration failure message to the network device.

According to the communication method provided in embodiments, the terminal device and the network device may determine a monitoring span pattern in a slot in the CA scenario based on the first configuration information configured by the network device for the terminal device, determine an actual monitoring capability in each monitoring span in the monitoring span pattern based on a capability supported by the terminal device, and send and monitor a downlink control channel in the scheduling cell based on the actual monitoring capability, to obtain the downlink control information of the scheduling cell or the scheduled cell. This can resolve a problem of excessively long monitoring time caused by monitoring downlink control information of cells one by one at a slot granularity and improve monitoring efficiency. In addition, data channels of the scheduling cell and the scheduled cell can be scheduled by using a monitoring span as a scheduling granularity, to shorten a scheduling period and improve scheduling efficiency.

It may be understood that, to implement functions in the foregoing embodiments, the network device and the terminal device include corresponding hardware structures and/or software modules for performing the functions. A person of ordinary skill in the art should easily be aware that, in combination with the units and the method steps in the examples described in the embodiments can be implemented by hardware or a combination of hardware and computer software. Whether a function is performed by hardware or hardware driven by computer software depends on particular application scenarios and constraints of the solutions.

Figure 11:
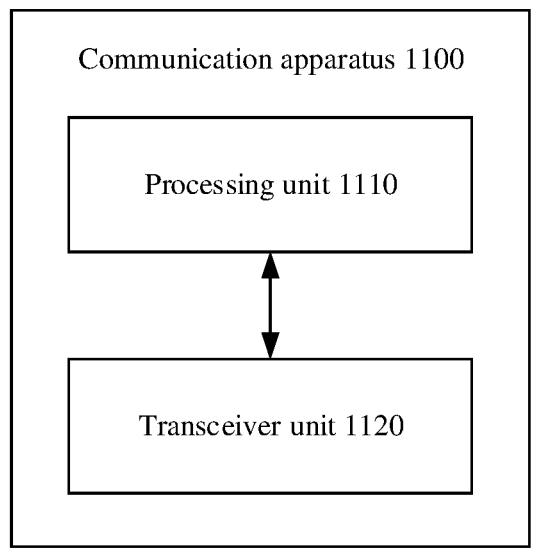
FIG. 11 is a schematic diagram 1 of a structure of a communication apparatus according to an embodiment.
Figure 12:
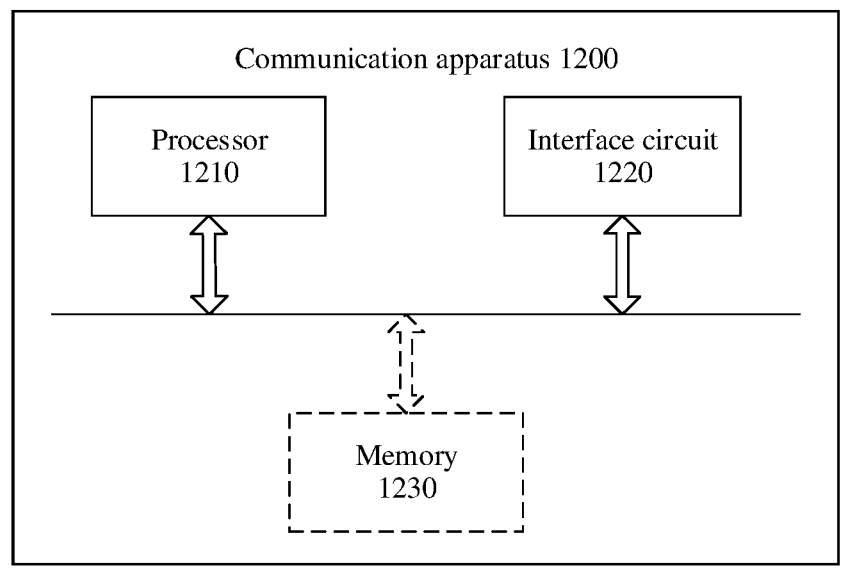
FIG. 12 is a schematic diagram 2 of a structure of a communication apparatus according to an embodiment.

FIG. 11 and FIG. 12 are schematic diagrams 1 and 2 of possible structures of communication apparatuses according to embodiments. These communication apparatuses can be configured to implement functions of the terminal device or the network device in the foregoing method embodiments, and therefore can also implement beneficial effects of the foregoing method embodiments. In embodiments, the communication apparatus may be the terminal device shown in FIG. 1 or may be the network device shown in FIG. 1 or may be a module or a component (for example, a chip) applied to the terminal device or the network device.

As shown in FIG. 11, the communication apparatus 1100 includes a processing unit 1110 and a transceiver unit 1120. The communication apparatus 1100 is configured to implement the functions of the terminal device or the network device in the method embodiment shown in FIG. 4.

When the communication apparatus 1100 is configured to implement the functions of the terminal device in the method embodiment shown in FIG. 4, the transceiver unit 1120 is configured to: receive first configuration information from the network device, send a first capability report and/or a second capability report to the network device, and the like. The processing unit 1110 is configured to: determine a first monitoring span pattern based on a search space configuration of a scheduling cell and a search space configuration of a scheduled cell, control the transceiver unit 1120 to monitor a first downlink control channel based on the first monitoring span pattern, and the like.

When the communication apparatus 1100 is configured to implement the functions of the network device in the method embodiment shown in FIG. 4, the transceiver unit 1120 is configured to: send the first configuration information to the terminal device, receive the first capability report and/or the second capability report from the terminal device, and the like. The processing unit 1110 is configured to: determine the first monitoring span pattern based on the search space configuration of the scheduling cell and the search space configuration of the scheduled cell, control the transceiver unit 1120 to send the first downlink control channel based on the first monitoring span pattern, and the like.

Optionally, the communication apparatus 1100 shown in FIG. 11 may further include a storage unit (not shown in FIG. 11), and the storage unit stores a program or instructions. When the processing unit 1110 executes the program or the instructions, the communication apparatus 1100 may perform the functions of the terminal device or the network device in the communication method shown in FIG. 4.

More detailed description about the processing unit 1110 and the transceiver unit 1120 may be directly obtained from related description in the method embodiment shown in FIG. 4, and details are not described herein again.

As shown in FIG. 12, the communication apparatus 1200 includes a processor 1210 and an interface circuit 1220. The processor 1210 and the interface circuit 1220 are coupled to each other. It may be understood that the interface circuit 1220 may be a transceiver or an input/output interface. Optionally, the communication apparatus 1200 may further include a memory 1230, configured to store instructions executed by the processor 1210, or input data required by the processor 1210 to run the instructions, or data generated after the processor 1210 runs the instructions.

When the communication apparatus 1200 is configured to implement the method shown in FIG. 4, the processor 1210 is configured to perform the functions of the processing unit 1110, and the interface circuit 1220 is configured to perform the functions of the transceiver unit 1120.

When the communication apparatus is a chip applied to a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip applied to a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

The processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any combination thereof. When software is used for implementing the foregoing embodiments, all or some of the embodiments may be implemented in a form of a computer program product. The computer program product includes one or more computer instructions or computer programs. When the computer instructions or the computer programs are loaded and executed on the computer, the procedure or functions according to some embodiments are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

It should be understood that the term "and/or" describes only an association relationship between associated objects and represents that three relationships may exist. For example, A and/or B may represent the following three cases: only A exists, both A and B exist, and only B exists. A and B may be singular or plural. In addition, the character "/" usually represents an "or" relationship between the associated objects or may represent an "and/or" relationship. A meaning depends on a context.

"At least one" means one or more, and "a plurality of" means two or more. "At least one item (piece) of the following" or a similar expression thereof indicates any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

It should be understood that serial numbers of the foregoing processes do not mean execution sequences in embodiments. The execution sequences of the processes should be determined according to functions and internal logic of the processes and should not be construed as any limitation on the implementation processes of embodiments.

A person of ordinary skill in the art may be aware that, in combination with the examples described in the embodiments, units and algorithm steps can be implemented by electronic hardware or a combination of computer software and electronic hardware. Whether the functions are performed by hardware or software depends on particular applications and constraint conditions of the solutions. A person skilled in the art may use different methods to implement the described functions for each particular application, but it should not be considered that the implementation goes beyond the scope.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments, it should be understood that the disclosed systems, apparatuses, and methods may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units and may be located in one position or may be distributed on a plurality of network units. Some or all of the units may be selected according to actual requirements to achieve the objectives of the solutions in the embodiments.

In addition, functional units in embodiments may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the solutions contributing to the prior art, or some of the solutions may be implemented in a form of a software product. The computer software product is stored in a storage medium and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. A communication method, comprising:
receiving first configuration information, wherein the first configuration information comprises first indication information and second indication information, the first indication information indicates a search space configuration of a scheduling cell, and the second indication information indicates a search space configuration of at least one scheduled cell corresponding to the scheduling cell;
determining a first monitoring span pattern based on the search space configuration of the scheduling cell and the search space configuration of the at least one scheduled cell, wherein the first monitoring span pattern comprises N monitoring spans in a first time unit, and N is a positive integer; and
monitoring a first downlink control channel based on the first monitoring span pattern, wherein the first downlink control channel carries downlink control information of the scheduling cell or downlink control information of the at least one scheduled cell, wherein monitoring the first downlink control channel based on the first monitoring span pattern comprises:
determining a first monitoring capability based on the search space configuration of the scheduling cell, the search space configuration of the at least one scheduled cell, and information about a capability supported by a terminal device, or based on information about a capability supported by a terminal device, wherein the first monitoring capability comprises a monitoring capability of monitoring a downlink control channel by the terminal device in each of the N monitoring spans; and
monitoring the first downlink control channel based on the first monitoring capability;
wherein the first monitoring capability is max{C(i)}, and C(i) is a monitoring capability in an $i^{th}$ monitoring span in the N monitoring spans; and $C(i) = r1*C1 + M(i)*r2*C1$, wherein C1 is a monitoring capability of monitoring a downlink control channel of one cell by the terminal device in each of the N monitoring spans, M(i) is a number of scheduled cells that are configured in the $i^{th}$ monitoring span and that correspond to the scheduling cell, r1 and r2 are real numbers less than or equal to 1 and greater than 0, and i is a positive integer less than or equal to N.

2. The communication method according to claim 1, further comprising:
sending a first capability report, wherein the first capability report is used for indicating the information about the capability supported by the terminal device, and the first capability report comprises a mapping relationship between a reference number of cells for downlink control channel blind detection and the monitoring capability of the terminal device in each of the N monitoring spans.

3. The communication method according to claim 1, wherein the determining the first monitoring span pattern based on the search space configuration of the scheduling cell and the search space configuration of the at least one scheduled cell further comprises:
determining a second monitoring span pattern of the scheduling cell based on the search space configuration of the scheduling cell, wherein the second monitoring span pattern comprises N1 monitoring spans in the first time unit, and N1 is a positive integer;
determining a third monitoring span pattern of a first scheduled cell based on a search space configuration of the first scheduled cell, wherein the third monitoring span pattern comprises N2 monitoring spans in the first time unit, N2 is a positive integer, and the first scheduled cell is one scheduled cell in the at least one scheduled cell; and
determining the N monitoring spans based on the N1 monitoring spans and the N2 monitoring spans.

4. A communication apparatus, comprising:
one or more processors; and
a non-transitory computer readable medium storing instructions that, when executed by the one or more processors, cause the apparatus to:
receive first configuration information, wherein the first configuration information comprises first indication information and second indication information, the first indication information indicates a search space configuration of a scheduling cell, and the second indication information indicates a search space configuration of at least one scheduled cell corresponding to the scheduling cell;
determine a first monitoring span pattern based on the search space configuration of the scheduling cell and the search space configuration of the at least one scheduled cell, wherein the first monitoring span pattern comprises N monitoring spans in a first time unit, and N is a positive integer; and
monitor a first downlink control channel based on the first monitoring span pattern, wherein the first downlink control channel carries downlink control information of the scheduling cell or downlink control information of the at least one scheduled cell, wherein the instructions causing the apparatus to monitor the first downlink control channel cause the apparatus to:
determine a first monitoring capability based on the search space configuration of the scheduling cell, the search space configuration of the at least one scheduled cell, and information about a capability supported by a terminal device, or based on information about a capability supported by a terminal device, wherein the first monitoring capability comprises a monitoring capability of monitoring a downlink control channel by the terminal device in each of the N monitoring spans; and
monitor the first downlink control channel based on the first monitoring capability;
wherein the first monitoring capability is max$\{(C(i)\}$, and $C(i)$ is a monitoring capability in an $i^{th}$ monitoring span in the N monitoring spans; and $C(i)=r1*C1+M(i)*r2*C1$, wherein C1 is a monitoring capability of monitoring a downlink control channel of one cell by the terminal device in each of the N monitoring spans, $M(i)$ is a number of scheduled cells that are configured in the $i^{th}$ monitoring span and that correspond to the scheduling cell, r1 and r2 are real numbers less than or equal to 1 and greater than 0, and i is a positive integer less than or equal to N.

5. The communication apparatus according to claim 4, wherein the instructions further cause the apparatus to:
send a first capability report, wherein the first capability report is used for indicating the information about the capability supported by the terminal device, and the first capability report comprises a mapping relationship between a reference number of cells for downlink control channel blind detection and the monitoring capability of the terminal device in each of the N monitoring spans.

6. The communication apparatus according to claim 4, wherein the instructions further cause the apparatus to:
determine a second monitoring span pattern of the scheduling cell based on the search space configuration of the scheduling cell, wherein the second monitoring span pattern comprises N1 monitoring spans in the first time unit, and N1 is a positive integer;
determine a third monitoring span pattern of a first scheduled cell based on a search space configuration of the first scheduled cell, wherein the third monitoring span pattern comprises N2 monitoring spans in the first time unit, N2 is a positive integer, and the first scheduled cell is one scheduled cell in the at least one scheduled cell; and
determine the N monitoring spans based on the N1 monitoring spans and the N2 monitoring spans.

7. A communication apparatus, comprising:
one or more processors; and
a non-transitory computer readable medium storing instructions that, when executed by the one or more processors, cause the apparatus to:
send first configuration information to a terminal device, wherein the first configuration information comprises first indication information and second indication information, the first indication information indicates a search space configuration of a scheduling cell, and the second indication information indicates a search space configuration of at least one scheduled cell corresponding to the scheduling cell;
determine a first monitoring span pattern based on the search space configuration of the scheduling cell and the search space configuration of the at least one scheduled cell, wherein the first monitoring span pattern comprises N monitoring spans in a first time unit, and N is a positive integer; and
send a first downlink control channel based on the first monitoring span pattern, wherein the first downlink control channel carries downlink control information of the scheduling cell or downlink control information of the at least one scheduled cell, wherein the apparatus sends instructions causing the terminal device to monitor the first downlink control channel and that cause the terminal device to:

determine a first monitoring capability based on the search space configuration of the scheduling cell, the search space configuration of the at least one scheduled cell, and information about a capability supported by a terminal device, or based on information about a capability supported by a terminal device, wherein the first monitoring capability comprises a monitoring capability of monitoring a downlink control channel by the terminal device in each of N monitoring spans; and send the first downlink control channel based on the first monitoring capability;

wherein the first monitoring capability is max $\{C(i)\}$, and $C(i)$ is a monitoring capability in an $i^{th}$ monitoring span in the N monitoring spans; and $C(i) = r1*C1 + M(i)*r2*C1$, wherein C1 is a monitoring capability of monitoring a downlink control channel of one cell by the terminal device in each of N monitoring spans, $M(i)$ is a number of scheduled cells that are configured in the $i^{th}$ monitoring span and that correspond to the scheduling cell, r1 and r2 are real numbers less than or equal to 1 and greater than 0, and i is a positive integer less than or equal to N.

8. The communication apparatus according to claim 7, wherein the instructions further cause the apparatus to:

receive a first capability report, wherein the first capability report is used for indicating the information about the capability supported by the terminal device, and the first capability report comprises a mapping relationship between a reference number of cells for downlink control channel blind detection and the monitoring capability of the terminal device in each of the N monitoring spans; and determine the first monitoring capability based on the mapping relationship.

* * * * *